United States Patent
Ji et al.

(10) Patent No.: US 12,289,719 B2
(45) Date of Patent: Apr. 29, 2025

(54) TIMING ADVANCE-BASED SIDELINK GROUP SCHEDULING

(71) Applicant: QUALCOMM Incorporated, San Diego, CA (US)

(72) Inventors: Lianghai Ji, San Diego, CA (US); Qiang Wu, San Diego, CA (US); Huilin Xu, Temecula, CA (US); Jun Ma, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/450,447

(22) Filed: Oct. 8, 2021

(65) Prior Publication Data

US 2023/0116853 A1     Apr. 13, 2023

(51) Int. Cl.
*H04W 72/121* (2023.01)
*H04L 5/00* (2006.01)
(Continued)

(52) U.S. Cl.
CPC ......... *H04W 72/121* (2013.01); *H04L 5/0078* (2013.01); *H04W 24/10* (2013.01); *H04W 72/1263* (2013.01); *H04W 72/30* (2023.01)

(58) Field of Classification Search
CPC ... H04W 72/121; H04W 72/30; H04W 24/10; H04W 72/1263; H04W 4/08;
(Continued)

(56) References Cited

U.S. PATENT DOCUMENTS

2015/0036666 A1* 2/2015 Blankenship ..... H04W 56/0005
370/336
2016/0338094 A1* 11/2016 Faurie .................. H04W 88/04
(Continued)

FOREIGN PATENT DOCUMENTS

EP     3890208 A1     10/2021

OTHER PUBLICATIONS

Ericsson: "Group Mobility for Wearable Devices", 3GPP TSG-RAN WG3 #96, R3-171749, 3rd Generation Partnership Project, Mobile Competence Centre, 650, Route Des Lucioles, F-06921 Sophia-Antipolis Cedex, France, vol. RAN WG3, No. Hangzhou, China, May 15, 2017-May 19, 2017 May 6, 2017, XP051265644, 3 Pages.
(Continued)

*Primary Examiner* — Ian N Moore
*Assistant Examiner* — Latresa A McCallum
(74) *Attorney, Agent, or Firm* — Procopio, Cory, Hargreaves & Savitch LLP/QUALCOMM Incorporated

(57) ABSTRACT

A UE determines a group identifier based at least in part on a timing advance (TA) associated with the UE, the group identifier associated with at least the UE and a second UE and receives a sidelink resource allocation associated with the group identifier. The UE transmits sidelink communication using the sidelink resource allocation. A network node associates a UE with a group identifier based on a timing advance (TA) associated with the UE and transmits a sidelink resource allocation associated with the group identifier, the group identifier associated with at least the UE and a second UE.

53 Claims, 20 Drawing Sheets

(51) Int. Cl.
*H04W 24/10* (2009.01)
*H04W 72/1263* (2023.01)
*H04W 72/30* (2023.01)

(58) Field of Classification Search
CPC ..... H04W 4/005; H04W 24/02; H04W 36/00; H04W 36/0083; H04W 36/0088; H04W 40/24; H04W 52/365; H04W 72/54; H04W 43/06; H04L 5/0078
See application file for complete search history.

(56) References Cited

U.S. PATENT DOCUMENTS

| | | | | |
|---|---|---|---|---|
| 2018/0213382 | A1* | 7/2018 | Tabet | H04W 8/005 |
| 2018/0310127 | A1* | 10/2018 | Xia | H04W 24/10 |
| 2018/0324842 | A1* | 11/2018 | Gulati | H04W 72/1263 |
| 2018/0368115 | A1* | 12/2018 | Li | H04L 5/0053 |
| 2020/0092685 | A1* | 3/2020 | Fehrenbach | H04W 84/005 |
| 2021/0144781 | A1* | 5/2021 | Xu | H04W 24/02 |
| 2021/0329510 | A1* | 10/2021 | Tseng | H04W 4/40 |
| 2021/0345323 | A1* | 11/2021 | Axmon | H04W 72/12 |

OTHER PUBLICATIONS

International Search Report and Written Opinion—PCT/US2022/043015—ISA/EPO—Dec. 15, 2022.
ETSI MCC: "Report of 3GPP TSG RAN WG2 meeting #114-e, Online", 3GPP TSG-RAN WG2 meeting #115-e, R2-2106901, May 19-27, 2021, Section 8.10.2.1, 294 Pages.
F3GPP: "3rd Generation Partnership Project, Technical Specification Group Radio Access Network, NR, Physical Layer Procedures for Data (Release 16)", 3GPP Standard, Technical Specification, 3GPP TS 38.214, V16.7.0, 3rd Generation Partnership Project, Mobile Competence Centre, 650, Route Des Lucioles, F-06921 Sophia-Antipolis Cedex, France, 50, vol. Ran WG1, No. V16.7.0, Sep. 2021, 172 Pages, Section 8.1.

* cited by examiner

| TA Range | Group Identifier |
|---|---|
| TA0 – TA1 | ID1 |
| TA2 – TA3 | ID2 |
| ... | ... |
| n – m | IDN |

FIG. 12A

| TA Value | Group Identifier |
|---|---|
| TA0 | ID1 |
| TA1 | ID2 |
| ... | ... |
| TAx | IDN |

FIG. 12B

TIMING ADVANCE-BASED SIDELINK GROUP SCHEDULING

INTRODUCTION

The present disclosure relates generally to communication systems, and more particularly, to sidelink resource scheduling.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a user equipment (UE). The method includes determining a group identifier based at least in part on a timing advance (TA) associated with the UE, the group identifier associated with at least the UE and a second UE and receiving a sidelink resource allocation associated with the group identifier. The method includes transmitting sidelink communication using the sidelink resource allocation.

In an aspect of the disclosure, an apparatus is provided for wireless communication at a UE. The apparatus includes means for determining a group identifier based at least in part on a TA associated with the UE, the group identifier associated with at least the UE and a second UE, means for receiving a sidelink resource allocation associated with the group identifier, and means for transmitting sidelink communication using the sidelink resource allocation.

In an aspect of the disclosure, an apparatus is provided for wireless communication at a UE. The apparatus includes memory and at least one processor, the memory and the at least one processor configured to determine a group identifier based at least in part on a TA associated with the UE, the group identifier associated with at least the UE and a second UE, receive a sidelink resource allocation associated with the group identifier, and transmit sidelink communication using the sidelink resource allocation. In an aspect of the disclosure, a non-transitory computer-readable storage medium storing computer executable code for wireless communication at a UE is provided, the code when executed by a processor causes the processor to: determine a group identifier based at least in part on a TA associated with the UE, the group identifier associated with at least the UE and a second UE, receive a sidelink resource allocation associated with the group identifier, and transmit sidelink communication using the sidelink resource allocation.

In an aspect of the disclosure, a method is provided for wireless communication at a network node. The method includes associating a UE with a group identifier based on a TA associated with the UE and transmitting a sidelink resource allocation associated with the group identifier, the group identifier associated with at least the UE and a second UE.

In an aspect of the disclosure, an apparatus is provided for wireless communication at a network node. The apparatus includes means for associating a UE with a group identifier based on a TA associated with the UE and means for transmitting a sidelink resource allocation associated with the group identifier, the group identifier associated with at least the UE and a second UE.

In an aspect of the disclosure, an apparatus is provided for wireless communication at a network node. The apparatus includes memory and at least one processor, the memory and the at least one processor configured to associate a UE with a group identifier based on a TA associated with the UE and transmit a sidelink resource allocation associated with the group identifier, the group identifier associated with at least the UE and a second UE.

In an aspect of the disclosure, a non-transitory computer-readable storage medium storing computer executable code for wireless communication at a network node is provided, the code when executed by a processor causes the processor to: associate a UE with a group identifier based on a TA associated with the UE and transmit a sidelink resource allocation associated with the group identifier, the group identifier associated with at least the UE and a second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 12A and 12B illustrate examples of a relationship between TA and group identifiers for sidelink resource allocation, in accordance with the teachings disclosed herein.

DETAILED DESCRIPTION

Figure 1:
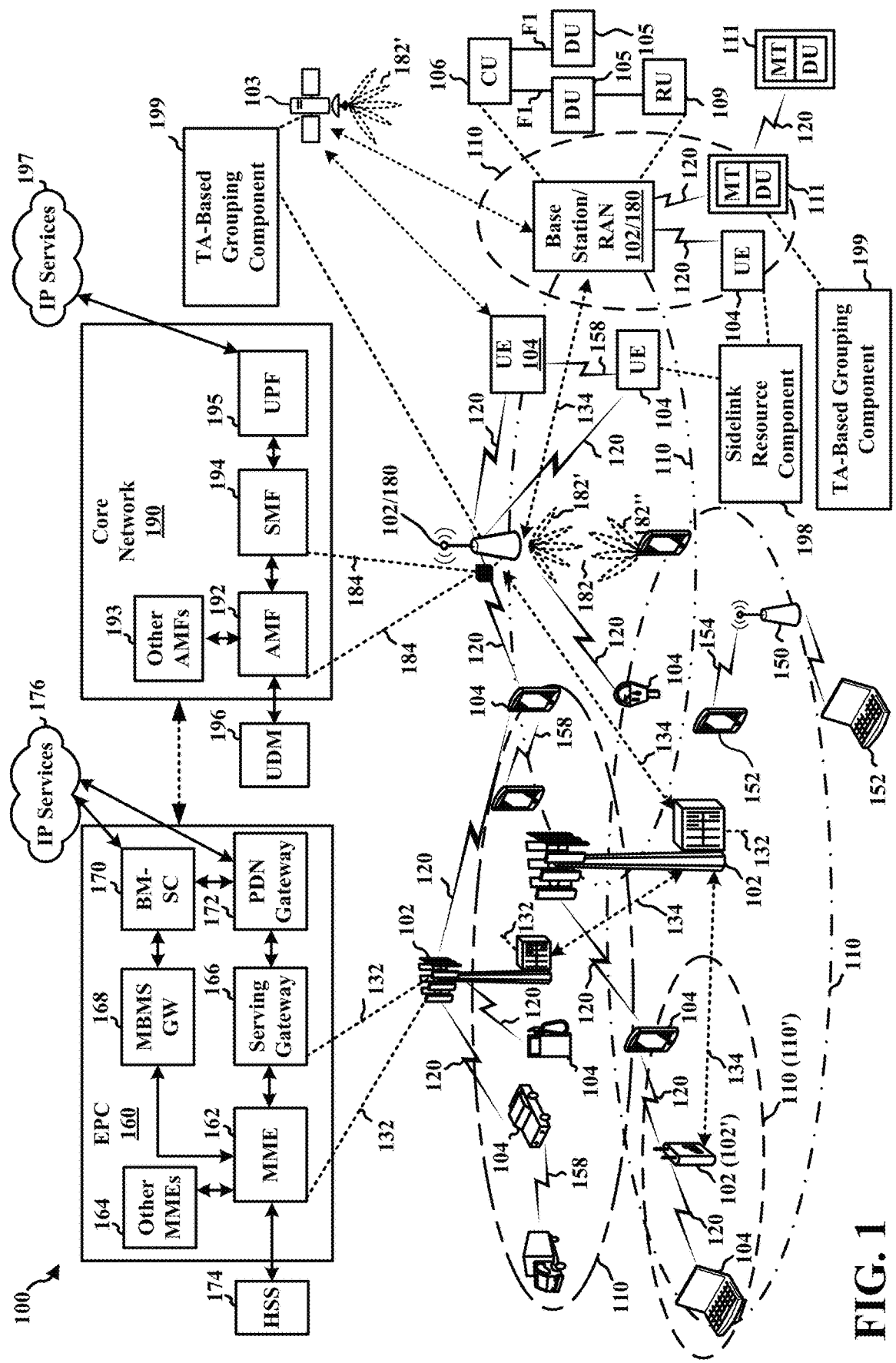
FIG. 1 is a diagram illustrating an example of a wireless communications system and an access network.

In some aspects, a UE may have data to exchange with another UE and may be outside of coverage of a terrestrial base station. Although the UE may be outside of coverage of a terrestrial base station, the UE may be within coverage of a non-terrestrial network (NTN). As an example, UEs in a rural may have limited terrestrial base station coverage, yet may be within coverage of an NTN. Sidelink communication may enable UEs to exchange local information. In a centralized resource allocation mode (e.g., NR sidelink Mode 1), resources for sidelink transmissions may be allocated by a network or central node. In a decentralized resource allocation mode (e.g., NR sidelink Mode 2), the UEs may autonomously select sidelink transmission resources, e.g., based on sensing and/or detection of resource reservations from other devices. Sidelink resource reuse may allow for UEs that are physically distant to reuse the same sidelink resources for sidelink transmission and may allow for increased efficiency in resource allocation. In some aspects, the centralized resource allocation of Mode 1 may provide for more reliable sidelink communication, as a scheduler may be aware of resources scheduled for transmissions by other devices. The coverage area of an NTN may be large, and may provide coverage for hundreds, thousands, or more UEs. The reporting of UE location information to facilitate sidelink resource reuse may involve signaling from a large number of UEs. As well, the allocation of sidelink resources to the UEs reusing the same sidelink resource via separate signaling messages involves added signaling at the network.

Aspects disclosed herein provide techniques to reduce signaling overhead with UEs for the centralized sidelink resource allocation mode. For example, by using groupcast, multicast, or broadcast, the signaling load may be reduced for the network node assigning the same sidelink resources to multiple served sidelink UEs. Such techniques may result in conserving NTN Uu resources. By reducing signaling overhead, the disclosed techniques may also improve cell capacity and improve spectral efficiency.

Aspects disclosed herein utilize timing advance information associated with UEs to group different UEs with a same group. The timing advance information may correspond to a timing advance value based on a propagation delay between when a signal is transmitted by a first device/network node/UE and received by a second device/network node/UE. The use of the timing advance information may allow for reduced signaling and/or processing at the UE/network node/device. The broadcast or groupcast of a resource allocation for a group of UEs reduces the signaling overhead for allocating resources to the UEs reusing the same resource. By grouping the UEs based on TA, the network may allocate sidelink resources in a way that allows for resource reuse while also avoiding/mitigating/reducing/controlling interference based on sidelink transmissions on shared resources. For example, by using groupcast, multicast, or broadcast, the signaling load for the network node to assign the same sidelink resources to multiple served sidelink UEs may be reduced. Such techniques may result in conserving NTN Uu resources. By reducing signaling overhead, the disclosed techniques may also improve cell capacity and improve spectral efficiency. Satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses a satellite, an airborne or spaceborne vehicle for transmission. An airborne vehicle may refer to High Altitude Platforms (HAPs) including Unmanned Aircraft Systems (UAS).

An NTN may help improve the roll-out of wireless communication (e.g., a 5G network) in un-served or under-served areas to upgrade the performance of terrestrial networks. For example, a communication satellite may provide coverage to a larger geographic region than a TN base station. The NTN may also reinforce service reliability by providing service continuity for user equipment or for moving platforms (e.g., passenger vehicles-aircraft, ships, high speed trains, buses). In some examples, the NTN may increase service availability, including critical communications. In some examples, the NTN may enable network scalability through the provision of efficient multicast/broadcast resources for data delivery towards the network edges or even directly to the user equipment.

In an example, an NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as a LEO device, a MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA), e.g., in altitudes typically between 8 and 50 km including High Altitude Platforms (HAPs).

In some aspects, the NTN may comprise an NR-NTN. The NTN may include a first NTN device, an NTN gateway, a data network, and a UE within cell coverage of the first NTN device. In some aspects, the UE may be connected to the NTN for wireless communication.

The NTN gateway may be one of one or more NTN gateways that transmit a signal between a first NTN device and a network node (e.g. a base station and/or a core network entity) on the ground. In some examples, the NTN gateway may support functions to forward a signal from the NTN device to a Uu interface, such as an NR-Uu interface. In other examples, the NTN gateway may provide a transport network layer node, and may support transport protocols, such as acting as an IP router. A satellite radio interface (SRI) may provide IP trunk connections between the NTN gateway and the NTN device to transport NG or F1 interfaces, respectively. One or more GEO devices may be fed by the NTN gateway, and the one or more NTN devices may be deployed across the satellite targeted coverage, which may correspond to regional coverage or even continental coverage. A non-GEO device may be served successively by one or more NTN gateways at a time, and the NTN may be configured to provide service and feeder link continuity between the successive serving NTN gateways with time duration to perform mobility anchoring and handover.

The first NTN device, including spaceborne vehicles or airborne vehicles, may communicate with the data network through a feeder link established between the first NTN device and the NTN gateway in order to provide service to the UE within the cell coverage, or a field-of-view of an NTN cell, of the first NTN device via a service link. The feeder link may include a wireless link between an NTN gateway and an NTN device. The service link may refer to a radio link between an NTN device (e.g., the first NTN device) and the UE. The first NTN device may use one or more directional beams, e.g., beamforming, to exchange communication with the UE. A beam may refer to a wireless communication beam generated by an antenna on-board an NTN device.

The UE may communicate with the first NTN device via the service link. In some examples, a second NTN device may relay the communication for the first NTN device through an inter-satellite link (ISL), and the second NTN device may communicate with the data network through the feeder link established between the second NTN device and the NTN gateway. The ISL may be provided between a constellation of satellites and may involve the use of transparent payloads on-board the NTN devices. The ISL may operate in an RF frequency or an optical band.

In an example aspect, the first NTN device may provide the NTN cell with a first physical cell ID (PCI). In some examples, a constellation of satellites may provide coverage to the NTN cell. For example, the first NTN device may include a non-GEO device that does not appear stationary with respect to the Earth. As such, a satellite constellation (e.g., one or more satellites) may be configured to provide coverage to the NTN cell. For example, the first NTN device and a third NTN device may be part of a satellite constellation that provides coverage to the NTN cell.

In some examples, an NTN deployment may provide different services based on the type of payload on-board the NTN device. The type of payload may determine whether the NTN device acts as a relay node or a base station. For example, a transport payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Aspects disclosed herein utilize timing advance information associated to UEs to different UEs of a same group. The timing advance information may correspond to a timing advance value based on a propagation delay between when a signal is transmitted by a first device/UE/network node and received by a second device/UE/network node. The timing advance may facilitate aligning a downlink slot and an uplink slot at a base station or a reference point, e.g. along the feeder link and determined by the network. In an NTN, a UE may apply a large timing advance value for its uplink transmission based on a delay associated with a received downlink signal.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. In some aspects, a UE 104 may include a sidelink resource component 198 configured to determine a group identifier based at least in part on a TA associated with the UE, the group identifier associated with at least the UE and a second UE, receive a sidelink resource allocation associated with the group identifier, and transmit sidelink communication using the sidelink resource allocation, e.g., as described in connection with any of FIGS. 9-16. A network node, such as an NTN device 103, a base station 102/180, or an IAB node 111 may include a TA-based grouping component 199 that is configured to associate a UE with a group identifier based on a TA associated with the UE and transmit a sidelink resource allocation associated with the group identifier, the group identifier associated with at least the UE and a second UE. In one example, at least some of the functions of a base station and/or core network may be located in the NTN device 103

The aspects disclosed herein provide techniques to reduce signaling overhead with UEs for the first resource allocation mode. For example, by using groupcast, multicast, or broadcast, the signaling load for the network node to assign the same sidelink resources to multiple served sidelink UEs may be reduced. Such techniques may result in conserving NTN Uu resources. By reducing signaling overhead, the disclosed techniques may also improve cell capacity and improve spectral efficiency. Although the following description provides examples directed to 5G NR (and, in particular, to resource allocation for sidelink communication), the concepts described herein may be applicable to other similar areas, such as LTE, LTE-A, CDMA, GSM, and/or other wireless technologies, in which resources are allocated for communication.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
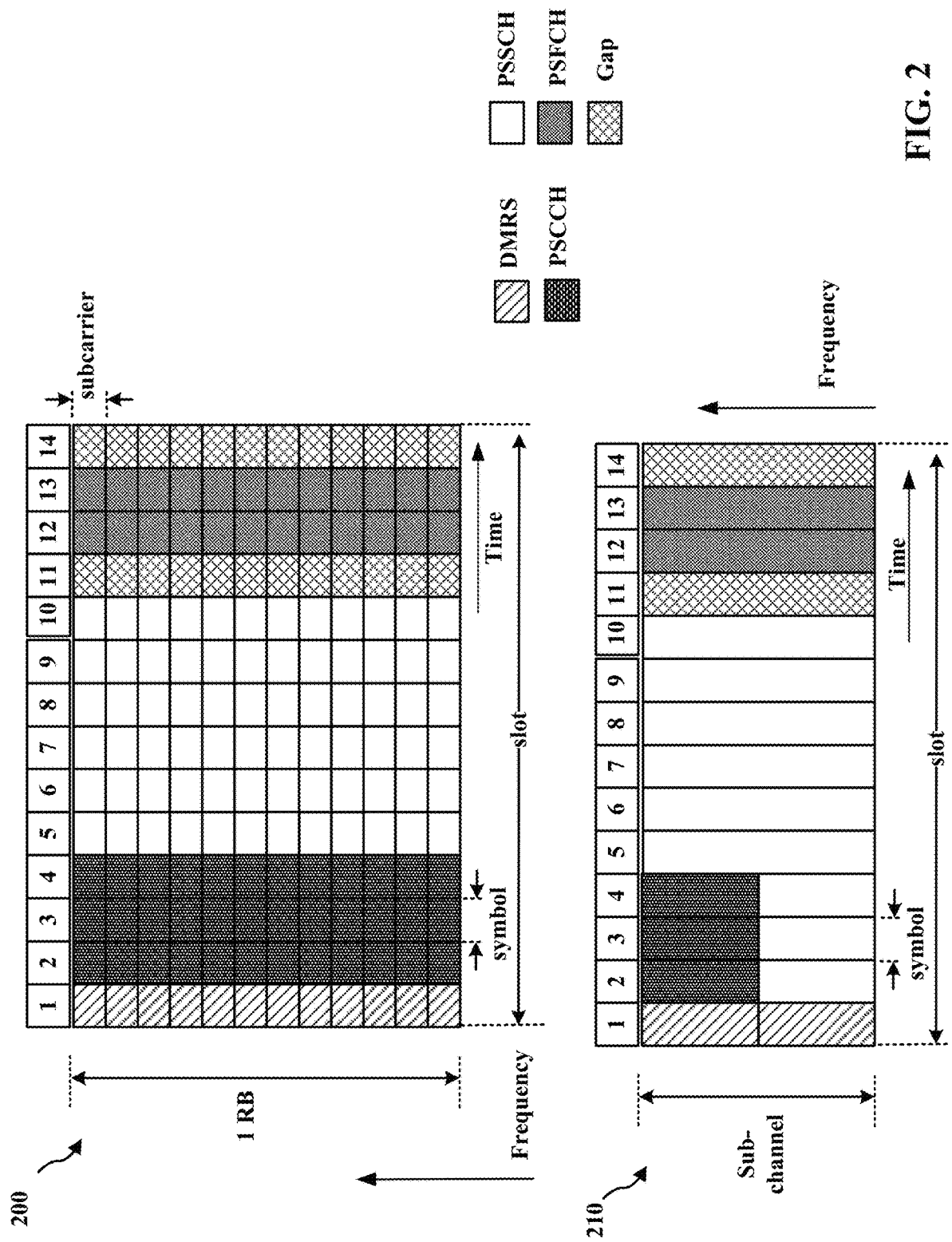
FIG. 2 is a diagram illustrating an example of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
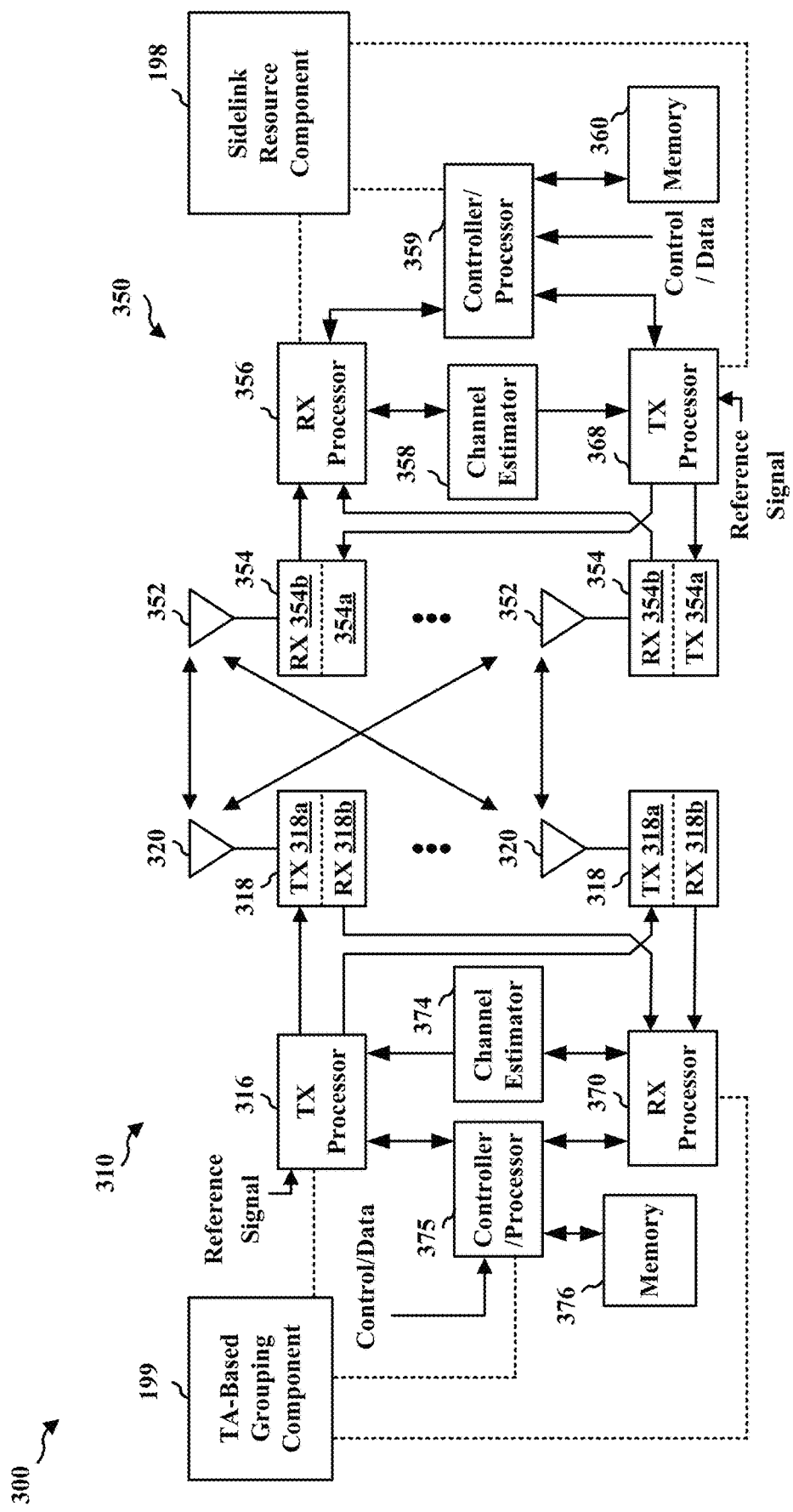
FIG. 3 is a diagram illustrating an example of a first wireless device in communication with a second wireless device, in accordance with aspects presented herein.

FIG. 3 is a block diagram that illustrates an example of a first wireless device that is configured to exchange wireless communication with a second wireless device. In the illustrated example, the first wireless device may include a network node 310, such as an NTN device 103, a base station 102/180, or an IAB node, the second wireless device may include a UE 350, and the network node 310 may be in communication with the UE 350 in an access network. As shown in FIG. 3, the network node 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the network node 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network node 310. These soft decisions may be based on channel estimates computed by the channel estimator 358. The soft decisions are then decoded and deinterleaved to recover the data and control signals that were originally transmitted by the network node 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the network node 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the network node 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink resource component 198 of FIG. 1.

At least one of the TX processor 316, the RX processor 370, and the controller/processor 375 may be configured to perform aspects in connection with the TA-based grouping component 199 of FIG. 1.

Figure 4:
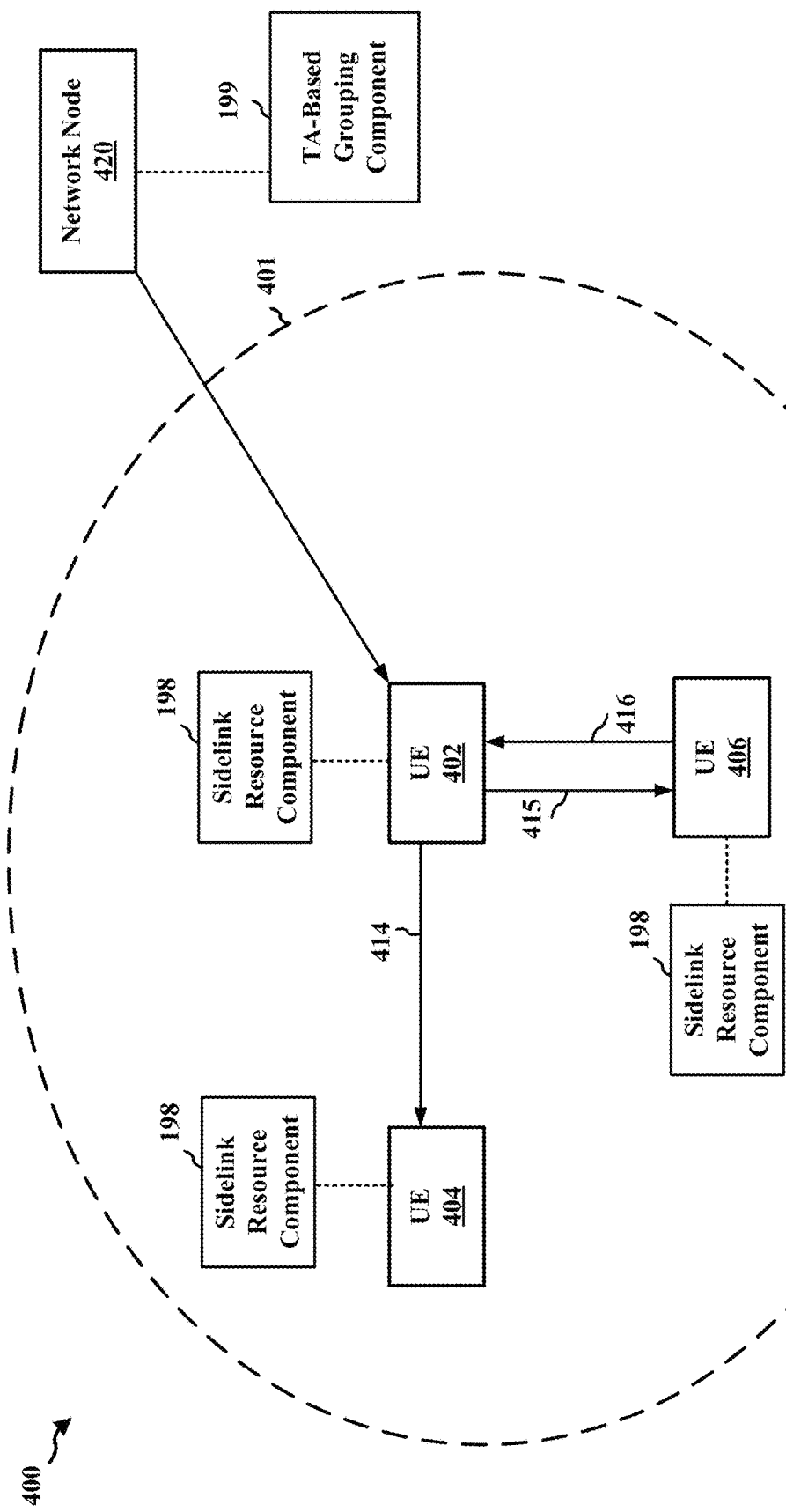
FIG. 4 illustrates example aspects of sidelink communication between devices, in accordance with aspects presented herein.

FIG. 4 illustrates an example 400 of sidelink communication between devices, as presented herein. The communication may be based on a slot structure. For example, a first UE 402 may transmit a sidelink transmission 414, e.g., comprising a control channel (e.g., PSCCH) and/or a corresponding data channel (e.g., PSSCH), that may be received by a second UE 404 and/or may transmit a sidelink transmission 415 that may be received by a third UE 406 directly from the first UE 402, e.g., without being transmitting through a base station.

The first UE 402, the second UE 404, and/or the third UE 406 may each be capable of operating as a transmitting device in addition to operating as a receiving device. For example, in the example of FIG. 4, the third UE 406 is illustrated as transmitting a sidelink transmission 416 that is received by the first UE 402. One or more of the sidelink transmissions may be broadcast or multicast to nearby devices. For example, the first UE 402 may transmit communication intended for receipt by other UEs within a range 401 of the first UE 402. In other examples, one or more of the sidelink transmissions may be groupcast to nearby devices that are a member of a group. In other examples, one or more of the sidelink transmissions may be unicast from one UE to another UE.

A sidelink transmission may provide sidelink control information (SCI) including information to facilitate decoding the corresponding data channel. The SCI may also include information that a receiving device may use to avoid interference. For example, the SCI may indicate reserved time resources and/or reserved frequency resources that will be occupied by the data transmission, and may be indicated in a control message from the transmitting device.

Sidelink communication may be based on different types or modes of resource allocation mechanisms. In a first resource allocation mode (which may be referred to herein as "Mode 1"), centralized resource allocation may be provided by a network entity, such as a network node 420. For example, the network node 420 may determine resources for sidelink communication and may allocate resources to different UEs to use for sidelink transmissions. In this first resource allocation mode, a UE receives the allocation of sidelink resources from the network node 420. In some examples, a UE receiving the allocation of sidelink resources from the network node 420 may be in a connected state (e.g., RRC_Connected state) with the network node 420. In some examples, aspects of the network node 420 may be implemented by a terrestrial network base station, such as the base stations 102/180 of FIG. 1. In some examples, aspects of the network node 420 may be implemented by a non-terrestrial network base station or an NTN device, such as the NTN device 103 of FIG. 1.

In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots for an aperiodic sidelink transmission.

One or more of the first UE 402, the second UE 404, and the third UE 406 may include a sidelink resource component, similar to the sidelink resource component 198 described in connection with FIG. 1. The network node 420 of FIG. 4 may include a TA-based grouping component, similar to the TA-based grouping component 199 described in connection with FIG. 1.

Satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may help improve the roll-out of wireless communication (e.g., a 5G network) in un-served or under-served areas to upgrade the performance of terrestrial networks. For example, a communication satellite may provide coverage to a larger geographic region than a TN base station. The NTN may also reinforce service reliability by providing service continuity for user equipment or for moving platforms (e.g., passenger vehicles-aircraft, ships, high speed trains, buses). In some examples, the NTN may increase service availability, including critical communications. In some examples, the NTN may enable network scalability through the provision of efficient multicast/broadcast resources for data delivery towards the network edges or even directly to the user equipment.

Figure 5:
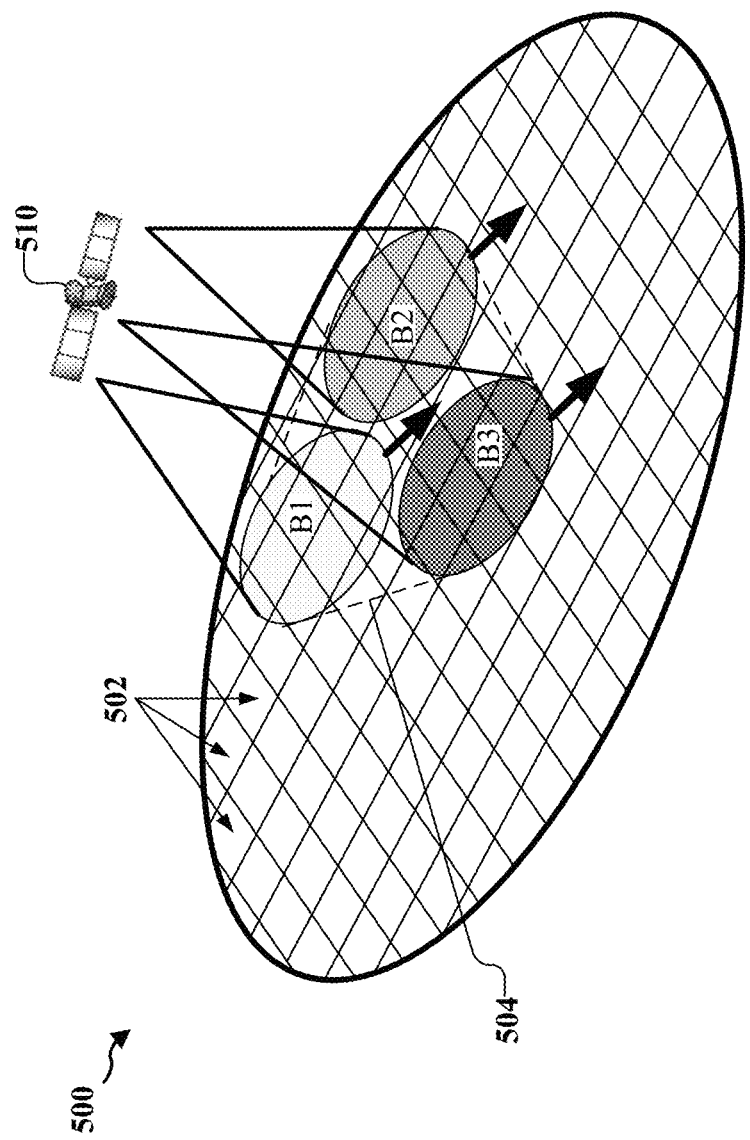
FIG. 5 illustrates radio cells produced by an NTN device over an area that includes a number of Earth-fixed cells, in accordance with various aspects of the present disclosure.

While supporting NTN access to a wireless network, an NTN device may transmit radio beams (also referred to as "beams"). FIG. 5 illustrates radio cells produced by an NTN device 510 over an area 500 that includes a number of Earth-fixed cells 502, as presented herein. A radio cell may comprise a single beam or multiple beams, e.g., all beams in a radio cell may use the same frequency or a radio cell may comprise one beam for each frequency in a set of different frequencies. For example, beams B1, B2, and B3 may support three separate radio cells (one beam per radio cell) or may collectively support a single radio cell (e.g., a radio cell 504 shown with dotted lines). A radio cell may or may not cover a single contiguous area.

Radio beams and radio cells produced by the NTN device 510 may not align with cells used by terrestrial wireless networks, e.g., NR terrestrial cells or LTE terrestrial cells. For example, in an urban area, a radio beam or radio cell produced by the NTN device 510 may overlap with many terrestrial cells. When supporting NTN access to a wireless network, radio beams and radio cells produced by the NTN device 510 may be hidden from the core network.

In the example of FIG. 5, there is a cell B1 that may be moving because it is being projected by the NTN device 510. The NTN device 510 could be transparent or a relay for base stations on the ground (e.g., as described in connection with the example of FIG. 6), or the NTN device 510 could be a base station, as described in connection with the examples of FIG. 7 and/or FIG. 7.

In the example of FIG. 5, because the cell B1 is being projected by the NTN device 510, the coverage area of the cell B1 may change over time. That is, at time T1, the cell B1 may be served by the NTN device 510. At a later time (e.g., at time T2), the cell B1 may be turned off and a new cell may be activated. The new cell may be located in the same region as the first cell (e.g., the cell B1). The new cell may be projected by the NTN device 510 or may be projected by a second satellite.

Figure 6:
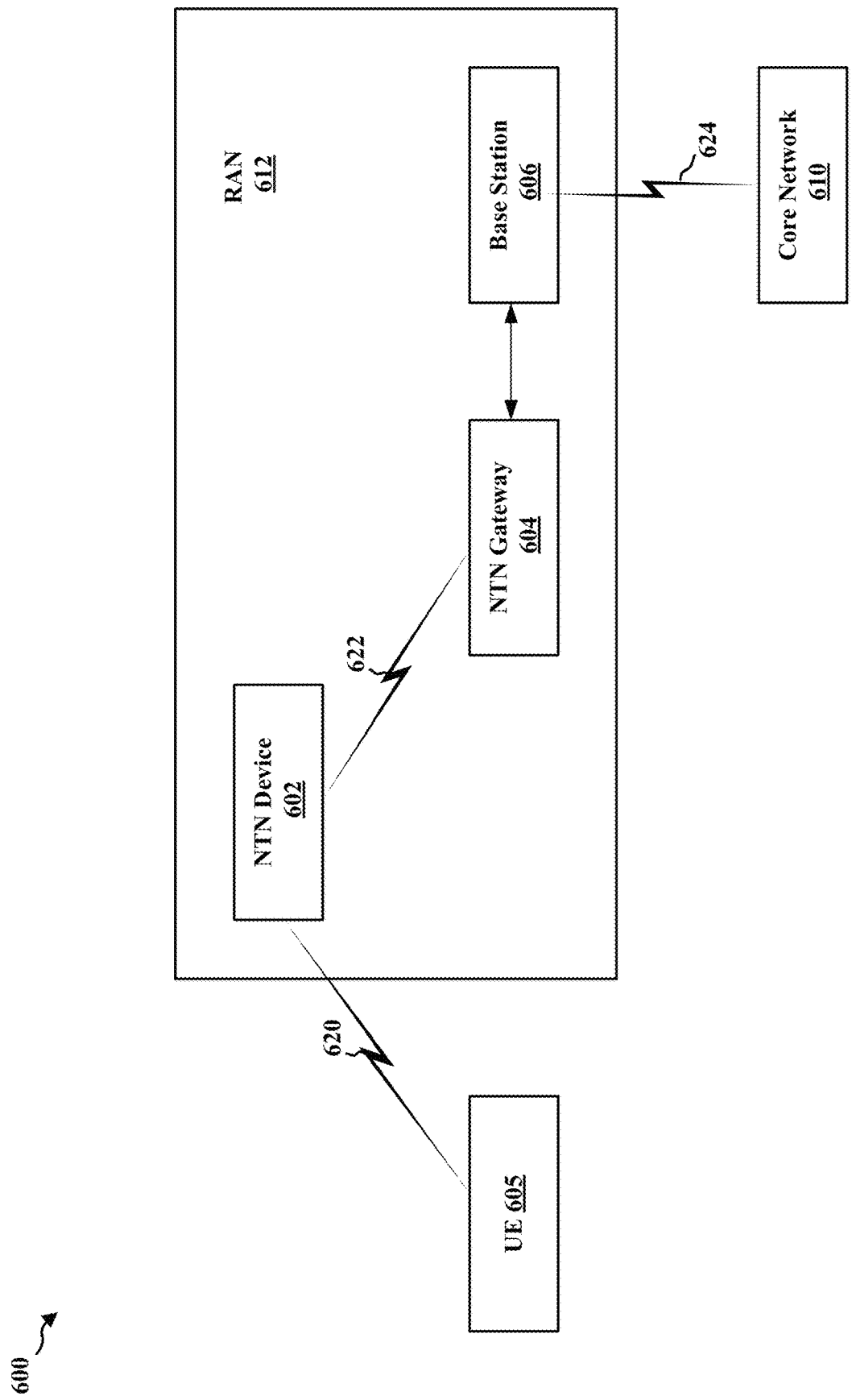
FIG. 6 illustrates an example network architecture capable of supporting NTN access, in accordance with various aspects of the present disclosure.

FIG. 6 illustrates an example network architecture 600 capable of supporting NTN access, e.g., using 5G NR, as presented herein. Although the aspects are described using the example of 5G NR, the concepts presented herein may also be applied for other types of core networks. FIG. 6 illustrates a network architecture with transparent payloads. While aspects of FIG. 6 illustrate a 5G-based network, similar network implementations and configurations may be used for other communication technologies, such as 3G, 5G LTE, etc.

The network architecture 600 of FIG. 6 includes a UE 605, an NTN device 602, an
NTN gateway 604 (sometimes referred to as "gateways," "earth stations," or "ground stations"), and a base station 606 having the capability to communicate with the UE 605 via the NTN device 602. The NTN device 602, the NTN gateway 604, and the base station 606 may be part of a RAN 612 (e.g., an NG RAN).

The base station 606 may correspond to the network node 310 of FIG. 3. The network architecture 600 is illustrated as further including a core network 610. In some aspects, the core network 610 may include a number of Fifth Generation (5G) networks including 5G Core Networks (5GCNs) and may correspond to the core network 190 described in connection with FIG. 1. The core network 610 may be public land mobile networks (PLMN) that may be located in the same country or in different countries. In some aspects, the core network may be 5GCNs.

Permitted connections in the network architecture 600 with transparent payloads illustrated in FIG. 6, allow the base station 606 to access the NTN gateway 604 and the core network 610. In some examples, the base station 606 may be shared by multiple PLMNs. Similarly, the NTN gateway 604 may be shared by more than one base station.

FIG. 6 provides a generalized illustration of various components, any or all of which may be utilized as appropriate, and each of which may be duplicated or omitted, as necessary. Specifically, although the example of FIG. 6 includes one UE 605, it will be understood that many UEs (e.g., hundreds, thousands, millions, etc.) may utilize the network architecture 600. Similarly, the network architecture 600 may include a larger (or smaller) number of NTN devices, NTN gateways, base stations, RAN, core networks, and/or other components. The illustrated connections that connect the various components in the network architecture 600 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 605 is configured to communicate with the core network 610 via the NTN device 602, the NTN gateway 604, and the base station 606. As illustrated by the RAN 612, one or more RANs associated with the core network 610 may include one or more base stations. Access to the network may be provided to the UE 605 via wireless communication between the UE 605 and the base station 606 (e.g., a serving base station), via the NTN device 602 and the NTN gateway 604. The base station 606 may provide wireless communications access to the core network 610 on behalf of the UE 605, e.g., using 5G NR.

The base station 606 may be referred to by other names such as a gNB, a "satellite node", a satellite NodeB (sNB), or "satellite access node." The base station 606 may not be the same as terrestrial network gNBs, but may be based on a terrestrial network gNB with additional capability. For example, the base station 606 may terminate the radio interface and associated radio interface protocols to the UE 605 and may transmit DL signals to the UE 605 and receive UL signals from the UE 605 via the NTN device 602 and the NTN gateway 604. The base station 606 may also support signaling connections and voice and data bearers to the UE 605 and may support handover of the UE 605 between different radio cells for the NTN device 602, between different NTN devices and/or between different base stations. The base station 606 may be configured to manage moving radio beams (e.g., for airborne vehicles and/or non-GEO devices) and associated mobility of the UE 605. The base station 606 may assist in the handover (or transfer) of the NTN device 602 between different NTN gateways, different base stations, and between different countries. In some examples, the base station 606 may be separate from the NTN gateway 604, e.g., as illustrated in the example of FIG. 6. In some examples, the base station 606 may include or may be combined with one or more NTN gateways, e.g., using a split architecture. For example, with a split architecture, the base station 606 may include a Central Unit (CU), such as the example CU 106 of FIG. 1, and the NTN gateway 604 may include or act as Distributed Unit (DU), such as the example DU 105 of FIG. 1. The base station 606 may be fixed on the ground with transparent payload operation. In one implementation, the base station 606 may be physically combined with, or physically connected to, the NTN gateway 604 to reduce complexity and cost. The NTN gateway 604 may be shared by more than one base station and may communicate with the UE 605 via the NTN device 602. The NTN gateway 604 may be dedicated to one associated constellation of NTN devices. The NTN gateway 604 may be included within the base station 606, e.g., as a base station-DU within the base station 606. The NTN gateway 604 may communicate with the NTN device 602 using control and user plane protocols. The control and user plane protocols between the NTN gateway 604 and the NTN device 602 may: (i) establish and release the NTN gateway 604 to the NTN device 602 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 602 or radio cell to another NTN gateway.

Support of transparent payloads with the network architecture 600 shown in FIG. 6 may impact the communication system as follows. The core network 610 may treat a satellite RAT as a new type of RAT with longer delay, reduced bandwidth and/or higher error rate. Consequently, there may be some impact to PDU session establishment and mobility management (MM) and connection management (CM) procedures. The NTN device 602 may be shared with other services (e.g., satellite TV, fixed Internet access) with 5G NR mobile access for UEs added in a transparent manner. This may enable legacy NTN devices to be used and may avoid the need to deploy a new type of NTN device. Further, the base station 606 may be fixed and may be configured to support one country or multiple countries and one or more PLMNs in that one country or in those multiple countries. The base station 606 may assist assignment and transfer of the NTN device 602 and radio cells between the base station 606 and the NTN gateway 604 and support handover of the UE 605 between radio cells, NTN devices, and other base stations. Thus, the base station 606 may differ from a terrestrial network gNB. Additionally, a coverage area of the base station 606 may be much larger than the coverage area of a terrestrial network base station.

In some implementations, the radio beam coverage of the NTN device 602 may be large, e.g., up to or greater than 4000 kms across, and may provide access to more than one country. The base station 606 may be shared by multiple base stations, and the base station 606 may be shared by multiple core networks in separate PLMNs located in the same country or in different countries.

In the illustrated example of FIG. 6, a service link 620 may facilitate communication between the UE 605 and the NTN device 602, a feeder link 622 may facilitate communication between the NTN device 602 and the NTN gateway 604, and an interface 624 may facilitate communication between the base station 606 and the core network 610. The service link 620 and the feeder link 622 may be implemented by a same radio interface (e.g., the NR-Uu interface). The interface 624 may be implemented by the NG interface.

Figure 7:
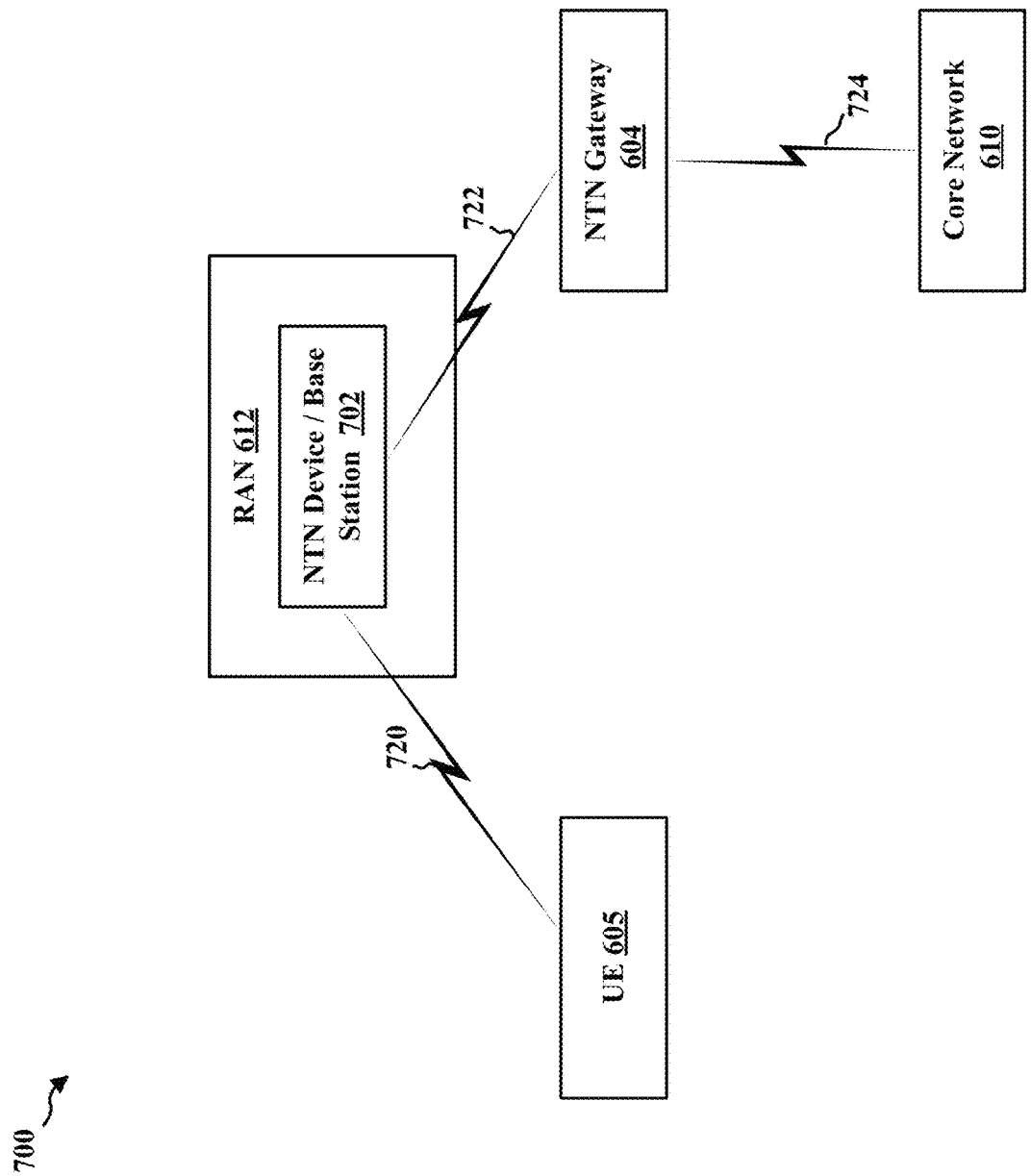
FIG. 7 shows a diagram of another network architecture capable of supporting NTN access, in accordance with various aspects of the present disclosure

FIG. 7 shows a diagram of a network architecture 700 capable of supporting NTN access, e.g., using 6G NR, as presented herein. The network architecture 700 shown in FIG. 7 is similar to that shown in FIG. 6, like designated elements being similar or the same. FIG. 7, however, illustrates a network architecture with regenerative payloads, as opposed to transparent payloads shown in FIG. 6. A regenerative payload, unlike a transparent payload, includes an on-board base station (e.g., includes the functional capability of a base station), and is referred to herein as an NTN device/base station 702. The on-board base station may correspond to the network node 310 in FIG. 3. The RAN 612 is illustrated as including the NTN device/base station 702. Reference to the NTN device/base station 702 may refer to functions related to communication with the UE 605 and the core network 610 and/or to functions related to communication with the NTN gateway 604 and with the UE 605 at a physical radio frequency level.

An on-board base station may perform many of the same functions as the base station 606 as described previously. For example, the NTN device/base station 702 may terminate the radio interface and associated radio interface protocols to the UE 605 and may transmit DL signals to the UE 605 and receive UL signals from the UE 605, which may include encoding and modulation of transmitted signals and demodulation and decoding of received signals. The NTN device/base station 702 may also support signaling connections and voice and data bearers to the UE 605 and may support handover of the UE 605 between different radio cells for the NTN device/base station 702 and between different NTN device/base stations. The NTN device/base station 702 may assist in the handover (or transfer) of the UE 605 between different NTN gateways, different control networks, and between different countries. The NTN device/base station 702 may hide or obscure specific aspects of the NTN device/base station 702 from the core network 610, e.g., by interfacing to the core network 610 in the same way or in a similar way to a terrestrial network base station. The NTN device/base station 702 may further assist in sharing of the NTN device/base station 702 over multiple countries. The NTN device/base station 702 may communicate with one or more NTN gateways and with one or more core networks via the NTN gateway 604. In some aspects, the NTN device/base station 702 may communicate directly with other NTN device/base stations using Inter-Satellite Links (ISLs), which may support an Xn interface between any pair of NTN device/base stations.

With LEO devices, the NTN device/base station 702 may manage moving radio cells with coverage in different countries at different times. The NTN gateway 604 may be connected directly to the core network 610, as illustrated. The NTN gateway 604 may be shared by multiple core networks, for example, if NTN gateways are limited. In some examples the core network 610 may need to be aware of coverage area(s) of the NTN device/base station 702 in order to page the UE 605 and to manage handover. Thus, as can be seen, the network architecture 700 with regenerative payloads may have more impact and complexity with respect to both the NTN device/base station 702 and the core network 610 than the network architecture 600 including transparent payloads, as shown in FIG. 6.

Support of regenerative payloads with the network architecture 700 shown in FIG. 7 may impact the network architecture 700 as follows. The core network 610 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 605). If fixed tracking areas and fixed cells are supported, the core network 610 may map any fixed tracking area to one or more NTN device/base stations with current radio coverage of the fixed tracking area when performing paging of the UE 605 that is located in this fixed tracking area. This could include configuration in the core network 610 of long term orbital data for the NTN device/base station 702 (e.g., obtained from an operator of the NTN device/base station 702) and could add significant new impact to core network 610.

The NTN device/base station 702 may support regulatory and other requirements for multiple countries. A GEO device coverage area may include several or many countries, whereas a LEO device or an MEO device may orbit over many countries. Support of fixed tracking areas and fixed cells may then include the NTN device/base station 702 configured with fixed tracking areas and fixed cells for an entire worldwide coverage area. Alternatively, the core network 610 may support fixed tracking areas and fixed cells for the associated PLMN to reduce complexity of the NTN device/base station 702 and at the expense of more complexity at the core network 610. Additionally, ISLs between NTN device/base stations may change dynamically as relative NTN device/base station 702 positions change.

In the illustrated example of FIG. 7, a service link 720 may facilitate communication between the UE 605 and the NTN device/base station 702, a feeder link 722 may facilitate communication between the NTN device/base station 702 and the NTN gateway 604, and an interface 724 may facilitate communication between the NTN gateway 604 and the core network 610. The service link 720 may be implemented by the NR-Uu interface. The feeder link 722 may be implemented by the NG interface over SRI. The interface 724 may be implemented by the NG interface.

Figure 8:
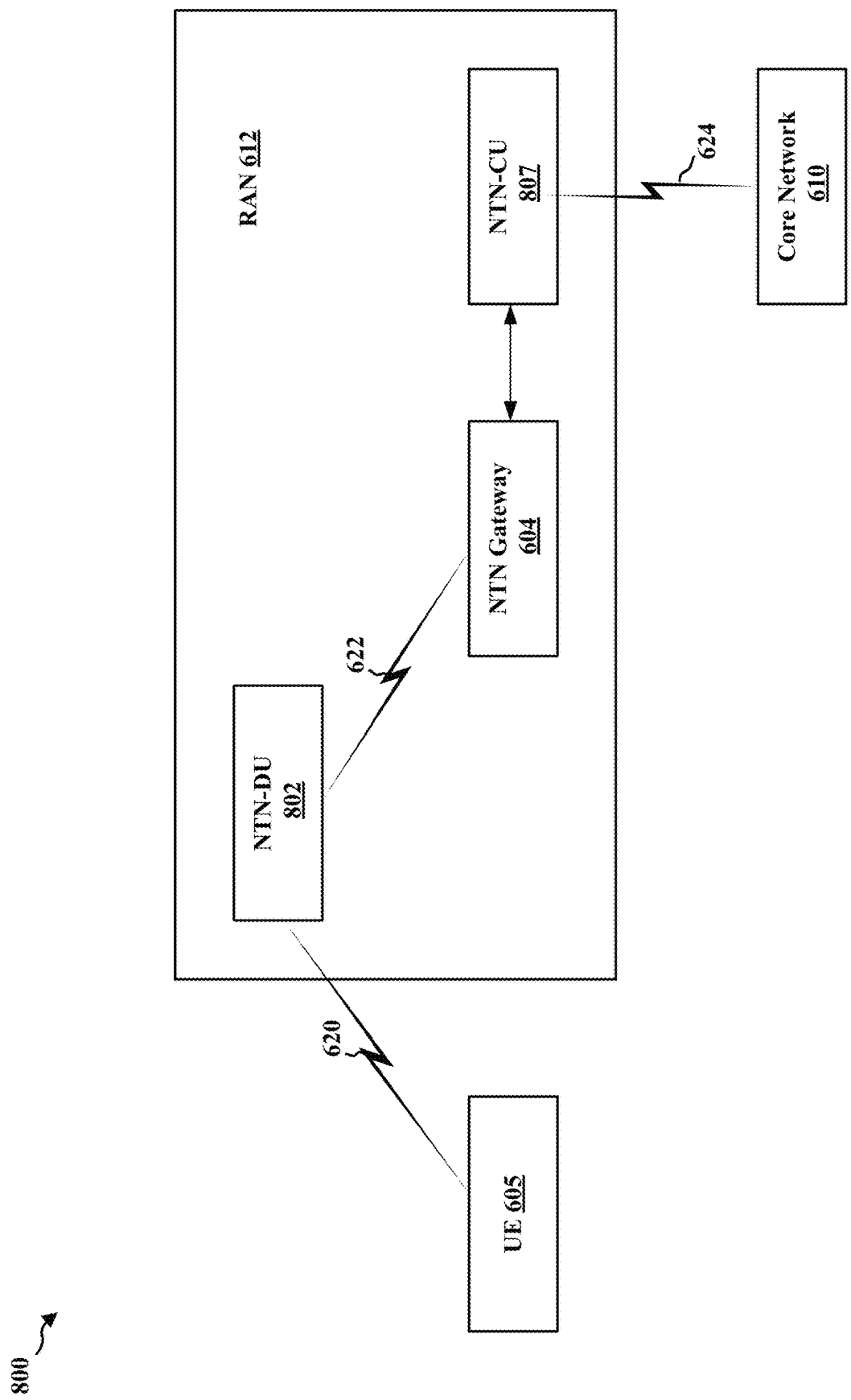
FIG. 8 shows a diagram of another network architecture capable of supporting NTN access, in accordance with various aspects of the present disclosure

FIG. 8 shows a diagram of a network architecture 800 capable of supporting NTN access, e.g., using 5G NR, as presented herein. The network architecture shown in FIG. 8 is similar to that shown in FIGS. 6 and 7, like designated elements being similar or the same. FIG. 8, however, illustrates a network architecture with regenerative payloads, as opposed to transparent payloads, as shown in FIG. 6, and with a split architecture for the base station. For example, the base station may be split between a Central Unit (CU), such as the CU 106 of FIG. 1, and a Distributed Unit (DU), such as the DU 105 of FIG. 1. In the illustrated example of FIG. 8, the network architecture 800 includes an NTN-CU 807, which may be a ground-based base station or a terrestrial base station. The regenerative payloads include an on-board base station DU, and is referred to herein as an NTN-DU 802. The NTN-CU 807 and the NTN-DU 802, collectively or individually, may correspond to the network node 310 in FIG. 3.

The NTN-DU 802 communicates with the NTN-CU 807 via the NTN gateway 604. The NTN-CU 807 together with the NTN-DU 802 perform functions, and may use internal communication protocols, which are similar to or the same as a gNB with a split architecture. In the example, the NTN-DU 802 may correspond to and perform functions similar to or the same as a gNB Distributed Unit (gNB-DU), while the NTN-CU 807 may correspond to and perform functions similar to or the same as a gNB Central Unit (gNB-CU). However, the NTN-CU 807 and the NTN-DU 802 may each include additional capability to support the UE 605 access using NTN devices.

The NTN-DU 802 and the NTN-CU 807 may communicate with one another using an F1 Application Protocol (F1AP), and together may perform some or all of the same functions as the base station 606 or the NTN device/base station 702 as described in connection with FIGS. 6 and 7, respectively.

The NTN-DU 802 may terminate the radio interface and associated lower level radio interface protocols to the UE 605 and may transmit DL signals to the UE 605 and receive UL signals from the UE 605, which may include encoding and modulation of transmitted signals and demodulation and decoding of received signals. The operation of the NTN-DU 802 may be partly controlled by the NTN-CU 807. The NTN-DU 802 may support one or more NR radio cells for the UE 605. The NTN-CU 807 may also be split into separate control plane (CP) (NTN-CU-CP) and user plane (UP) (NTN-CU-UP) portions. The NTN-DU 802 and the NTN-CU 807 may communicate over an F1 interface to (a) support control plane signaling for the UE 605 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 807 may communicate with one or more other NTN-CUs and/or with one more other terrestrial base stations using terrestrial links to support an Xn interface between any pair of NTN-CUs and/or between the NTN-CU 807 and any terrestrial base station.

The NTN-DU 802 together with the NTN-CU 807 may: (i) support signaling connections and voice and data bearers to the UE 605; (ii) support handover of the UE 605 between different radio cells for the NTN-DU 802 and between different NTN-DUs; and (iii) assist in the handover (or transfer) of NTN devices between different NTN gateways, different core networks, and between different countries. The NTN-CU 807 may hide or obscure specific aspects of the NTN devices from the core network 610, e.g., by interfacing to the core network 610 in the same way or in a similar way to a terrestrial network base station. The NTN-CU 807 may further assist in sharing of NTN devices over multiple countries.

In the network architecture 800 of FIG. 8, the NTN-DU 802 that communicates with and is accessible from an NTN-CU may change over time with LEO devices. With the split base station architecture, the core network 610 may connect to NTN-CUs that are fixed and that do not change over time, which may reduce difficulty with paging of the UE 605. For example, the core network 610 may not need to know which NTN-DU is needed for paging the UE 605. The network architecture with regenerative payloads with a split base station architecture may thereby reduce the core network 610 impact at the expense of additional impact to the NTN-CU 807.

Support of regenerative payloads with a split base station architecture, as shown in FIG. 8, may impact the network architecture 800 as follows. The impact to the core network 610 may be limited as for the transparent payloads (e.g., the NTN device 602) discussed above. For example, the core network 610 may treat a satellite RAT in the network architecture 800 as a new type of RAT with longer delay, reduced bandwidth and/or higher error rate. The impact on the NTN-DU 802 may be less than the impact on NTN device/base stations (e.g., the NTN device/base station 702 with a non-split architecture), as discussed above in reference to FIG. 7. The NTN-DU 802 may manage changing association with different (fixed) NTN-CUs. Further, the NTN-DU 802 may manage radio beams and radio cells. The NTN-CU 807 impacts may be similar to the impact of the base station 606 for a network architecture with transparent payloads, as discussed above, except for extra impacts to manage changing associations with different NTN-DUs and reduced impacts to support radio cells and radio beams, which may be transferred to the NTN-DU 802.

Referring again to the example of FIG. 4, sidelink communication may be applied in local information exchange, and aspects presented herein may improve resource reuse and reduce signaling overhead for allocating sidelink resources. For example, sidelink transmitting UEs that are located far from each other may use the same resource for sidelink communication. In contrast, sidelink transmitting UEs that are near each other may not be assigned the same resources to use for sidelink communication, but may use different resources for their respective sidelink communication.

Figure 9:
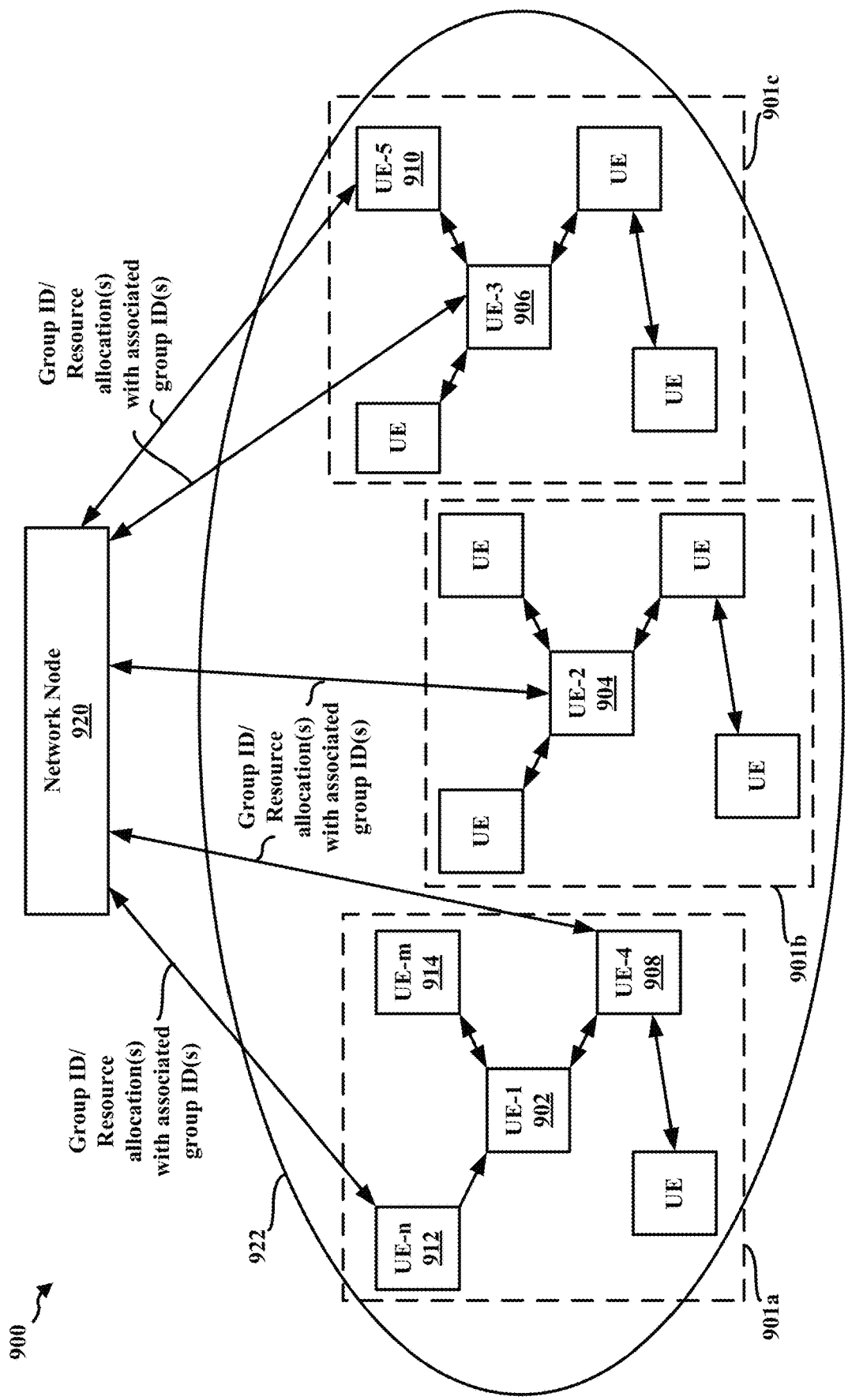
FIG. 9 illustrates example aspects of UE groups for sidelink resource allocation, in accordance with the teachings disclosed herein.

FIG. 9 illustrates an example 900 of sidelink communication between devices, as presented herein. Similar to the example of FIG. 4, the communication may be based on a slot structure. In the illustrated example of FIG. 9, a first UE 902 ("UE-1") and a third UE 906 ("UE-3") may be assigned the same resources to use for sidelink communication, because they are located far away and the mutual interference is lower. The added distance between two UEs may mean that the UEs are less likely to receive signals from each other, and therefore less likely to experience interference from each other. Additionally, or alternatively, the added distance between UEs may mean that even if the UEs receive a signal from each other, the received power may be lower than for UEs at closer distances, and the resulting interference due to such signals may be reduced compared to UEs at closer distances. However, when the first UE 902 and the fourth UE 908 transmit respective sidelink transmissions, the resources used for the respective sidelink transmissions may be different, for example, to avoid interference.

In an NTN cell, many UEs (e.g., hundreds, thousands, millions, etc.) may be served by an NTN device. For example, in the example of FIG. 9, a network node 920 may serve a coverage area 922 including the first UE 902, a second UE 904 ("UE-2"), a third UE 906 ("UE-3"), the fourth UE 908, and a fifth UE 910 ("UE-5"), etc. In such examples, to facilitate sidelink resource reuse, each of the UEs may provide location reports to the network node 920 that include UE locations. However, to provide such location reports, each of the UEs may be configured to maintain a positioning signal (e.g., a Global Navigation Satellite System (GNSS) signal) to keep track of their respective location. The transmitting of the location reports may also introduce additional signaling.

Additionally, as mentioned above, in the first resource allocation mode (Mode 1), the network node 920 provides the sidelink resource allocation to each sidelink transmitting UE independently. In some aspects, the centralized sidelink resources allocation based on Mode 1 may improve sidelink communication reliability, as a scheduler may be more aware of resources scheduled for transmissions by other devices. For example, the network node 920 may be in a connected state with the UEs and transmit respective sidelink resource allocations to each of the UEs. The large quantity of UEs in an NTN cell (e.g., the coverage area 922) that may be served by the network node 920 via the first resource allocation mode may result in a large overhead signaling over the NTN Uu interface (e.g., the control-plane between the network node 920 and the UEs).

Aspects disclosed herein provide techniques to reduce signaling overhead with UEs for the first resource allocation mode. For example, by using groupcast, multicast, or broadcast, the signaling load may be reduced for the network node to assign the same sidelink resources to multiple served sidelink UEs. Such techniques may result in conserving NTN Uu resources. By reducing signaling overhead, the disclosed techniques may also improve cell capacity and improve spectral efficiency.

Aspects disclosed herein utilize timing advance information to associate different UEs with a same group. The timing advance information may correspond to a timing advance value based on a propagation delay between when a signal is transmitted by a first device/network node/UE and received by a second device/network node/UE. The timing advance may facilitate aligning a downlink slot and an uplink slot at a base station or a reference point. In an NTN, a UE may apply a large timing advance value for its uplink transmission based on a delay associated with a received downlink signal.

Figure 10:
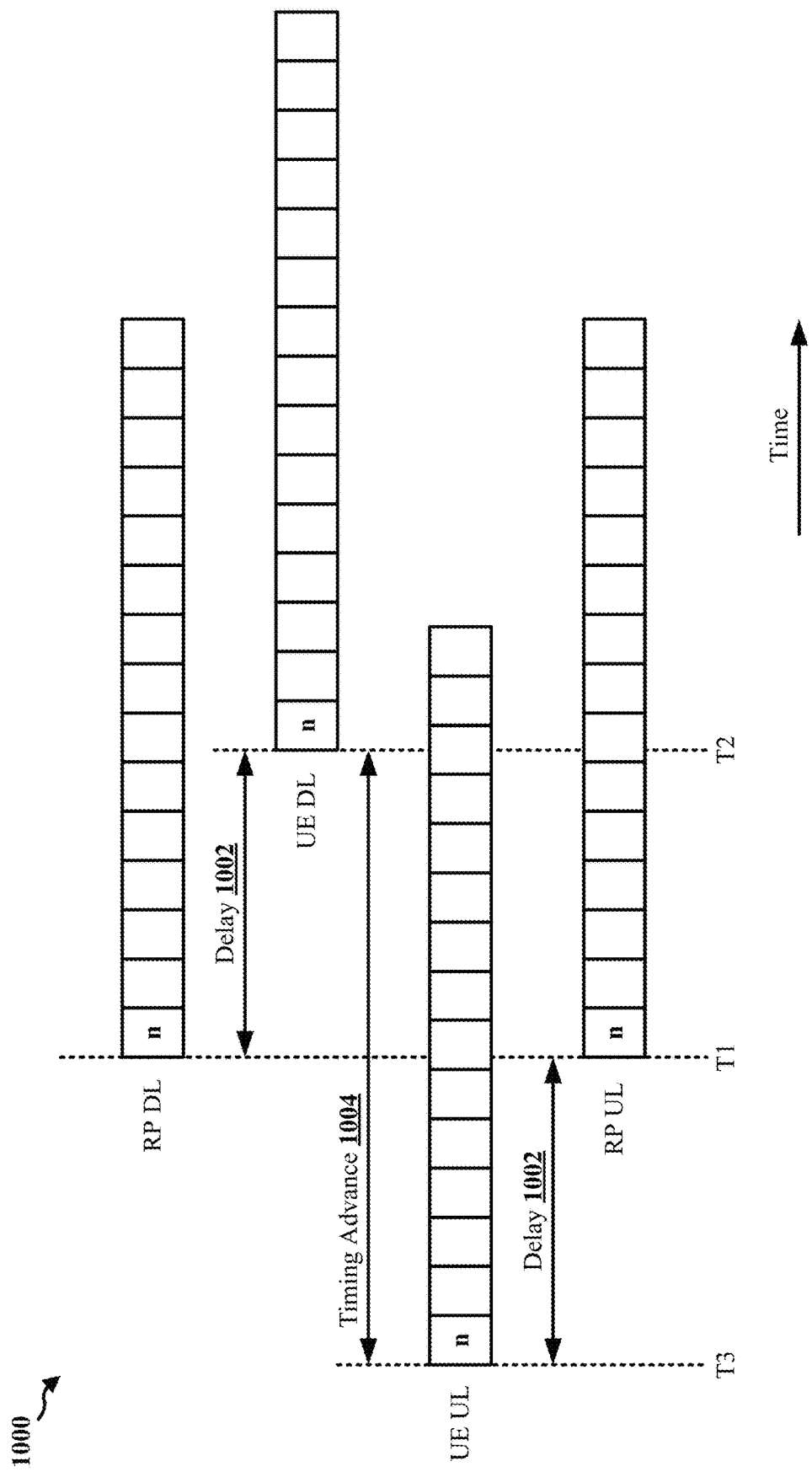
FIG. 10 illustrates example aspects of TA for a UE for wireless communication with a network node, in accordance with the teachings disclosed herein.

FIG. 10 illustrates an example timing diagram 1000 of uplink signals and downlink signals at a reference point (RP) and a UE, as presented herein. In some aspects, the reference point may be determined by a base station or a network node. In the illustrated example of FIG. 10, a reference point may transmit a downlink transmission to a UE in a downlink slot n at a first time ("T1"). As shown in FIG. 10, the UE may receive the downlink transmission in the downlink slot n at a second time ("T2"). The UE may use a timing difference between the time T1 and the time T2, e.g. based on the distance between the UE and the location of the NTN device, to determine a timing advance 1004, e.g. whose value is two times of delay 1002. As one example, the delay 1002 may correspond to a signal propagation delay between the reference point and the UE.

To determine the uplink frame timing for uplink slot m, the UE may apply a timing advance 1004 that corresponds to a round trip time between the UE and the reference point. For example, based on the delay 1002, the UE may determine the value of the timing advance 1004 as twice the timing duration of the delay 1002. In the illustrated example, the UE may transmit the uplink transmission in the uplink slot n at a third time ("T3"). As shown in FIG. 10, the reference point may receive the uplink transmission in the uplink slot n at the time T1. By applying the timing advance 1004 and transmitting the uplink transmission in the uplink slot n at the time T3, the downlink slot n and the uplink slot n at the reference point may be time-aligned.

Based on a UE's TA over an NTN Uu interface, the network node 920 may group UEs (which may also be referred to as clustering the UEs) into groups of multiple UEs. For example, the network node 920 may group UE-n 912 and UE-2 904 into a group, because they have different TA values for their UL transmissions. The network node 920 may allocate the same resources to each of the UEs in the group, and UE-2 912 and the UE-2 904 may transmit using the same sidelink resources, because the difference in their TA indicates that they are not close enough to each other to cause high mutual interference with their sidelink transmissions. Similarly, the UE-4 908 and the UE-5 910 may be grouped into a UE group for sidelink resource allocation. The UEs may be grouped based on their respective TAs so that multiple UEs in the same group have different timing advance's with the network node 920 (e.g., different NTN Uu timing advance values), which indicates that they are separated in distance from each other to allow sidelink transmission resource reuse that avoids, or reduces, mutual interference. In some aspects, a UE may report its UE specific TA to a network at the time of a RACH procedure or in the RRC_CONNECTED state, if enabled by the network. In such examples, the network may be aware of the TA of the UE after receiving the report. In some aspects, the UE may update its TA to the network, whether periodically or aperiodically, e.g. based on a configured event trigger. As an example, the UE may provide an aperiodic TA update in response to a change in the TA that is beyond a threshold level of change. The network may update the grouping of the UE based on the change in the TA. In some aspects, the UE may transmit its TA together with a sidelink scheduling request or buffer status. In some aspects, the UE may include a TA update value, e.g., a TA update MAC-CE, together with the sidelink buffer status report. In other aspects, a relationship may be configured, or defined, between sidelink scheduling request resources and a TA value or TA range. The UE may select transmit the scheduling request using a resource that corresponds to the UE's TA value, and the network node may interpret the resource on which it receives the scheduling request to obtain the TA information of the UE. The network node 920 may then transmit resources allocated to a group having a group identifier. Each of the UE's associated with the group ID may transmit using the resources allocated for the group.

Figure 11:
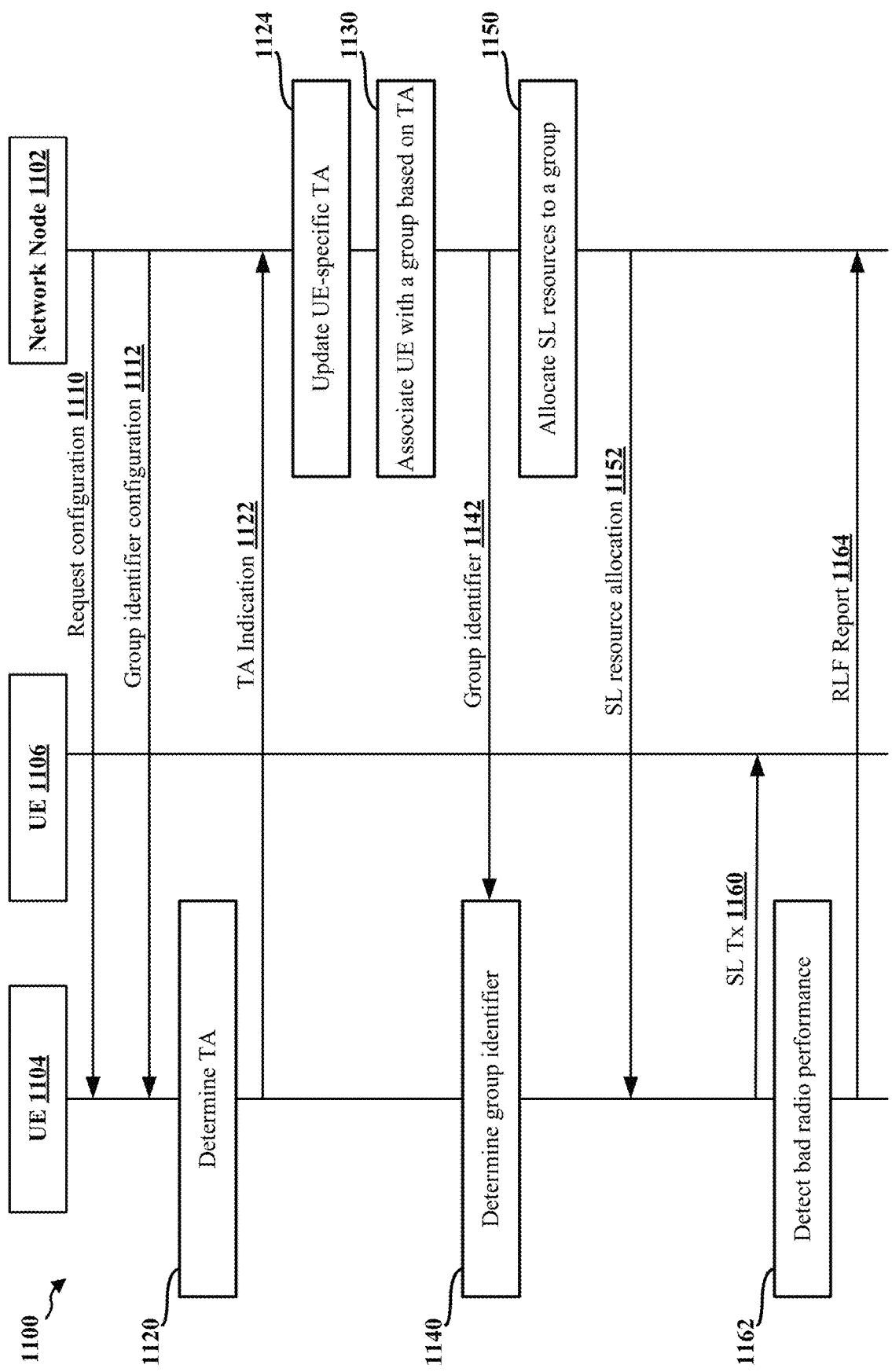
FIG. 11 is an example communication flow between a network node and a UE, in accordance with the teachings disclosed herein.

FIG. 11 illustrates an example communication flow 1100 between a network node 1102 and a UE 1104, as presented herein. In the illustrated example, the communication flow 1100 facilitates associating a group of UEs with a same group identifier based on respective timing advance values and the group identifier may be used to multicast the same sidelink resource allocation to multiple Mode 1 sidelink UEs (e.g., UEs receiving sidelink resources via the first resource allocation mode). Aspects of the network node 1102 may be implemented by implemented by the base station 102/180 of FIG. 1, the network node 310 of FIG. 3, the network node 420 of FIG. 4, the NTN device 510 of FIG. 5, the NTN device 602 of FIG. 6, the NTN device/base station 702 of FIG. 7, the NTN-DU 802 of FIG. 8, the NTN-CU 807 of FIG. 8, the network node 920 of FIG. 9. Aspects of the UE 1104 may be implemented by the UE 104 of FIG. 1, the UE 350 of FIG. 3, the UEs of FIG. 4, the UE 605 of FIGS. 6 to 8, and/or the UEs of FIG. 9. Although not shown in the illustrated example of FIG. 11, in additional or alternative examples, the network node 1102 may be in communication with one or more base stations or UEs, and/or the UEs may be in communication with one or more base stations or UEs.

As shown in FIG. 11, the UE 1104 transmits a TA indication 1122 that is received by the network node 1102. The TA indication 1122 may include a timing advance determined by the UE 1104. For example, at 1120, the UE 1104 may determine its timing advance, as described in connection with the example of FIG. 10. In some examples, the TA indication 1122 may additionally, or alternatively, include UE location information, sidelink traffic pattern information, a sidelink scheduling request (SR), and/or a sidelink buffer status report (BSR).

In some examples, the UE 1104 may transmit the TA indication 1122 via a MAC-CE while performing a random access procedure with the network node 1102 and/or when the UE 1104 is in RRC_CONNECTED state with the network node 1102. In such examples, the TA indication 1122 may include a message A ("MSG A"), a message 1/3 ("MSG 1/3") or a message 5 ("MSG 5"). In some examples, the TA indication 1122 may include an update on a timing advance of the UE 1104. For example, the UE 1104 may periodically or aperiodically transmit the TA indication 1122 to the network node 1102. In some examples, the UE 1104 may transmit the TA indication 1122 including an updated timing advance when a change in a timing advance is greater or equal to a timing advance threshold. The UE 1104 may determine the TA, at 1120 based on any of the aspects described in connection with FIG. 10, for example. At 1124, the network node 1102 may update the UE-specific TA based on the TA indication 1122. Alternatively, or additionally, the network node 1102 may obtain and/or update the UE-specific TA based on the timing of the UL signal arriving at the network node 1102 from the UE 1104.

At 1130, the network node may group the UE, along with at least one additional UE, into a UE group (or cluster) for sidelink resource allocation. The network node may group UEs having different TAs, e.g., as described in connection with FIG. 9. In some aspects, the network node 1102 may transmit an indication of the group identifier for the group (or cluster) to the UE 1104, at 1142. In some aspects, the network node 1102 may transmit an indication of the group identifier for the group (or cluster) to the UE 1104 and the at least one additional UE, at 1142. The network node 1102 allocates sidelink resources to a group, e.g., for one or more groups, at 1150. The network node 1102 may then transmit an allocation of sidelink resources, at 1152, for the group. The resource allocation may include and/or use the group identifier. In one example, at least part of the resource allocation information may be scrambled by using the group identifier and transmitted to the UEs in the group. The network node 1102 may multicast or groupcast the sidelink resource allocation 1152, so that it can be received by various UEs in the UE group. Each of the UEs in the group may transmit a sidelink transmission using one or more of the allocated resources.

Figure 13:
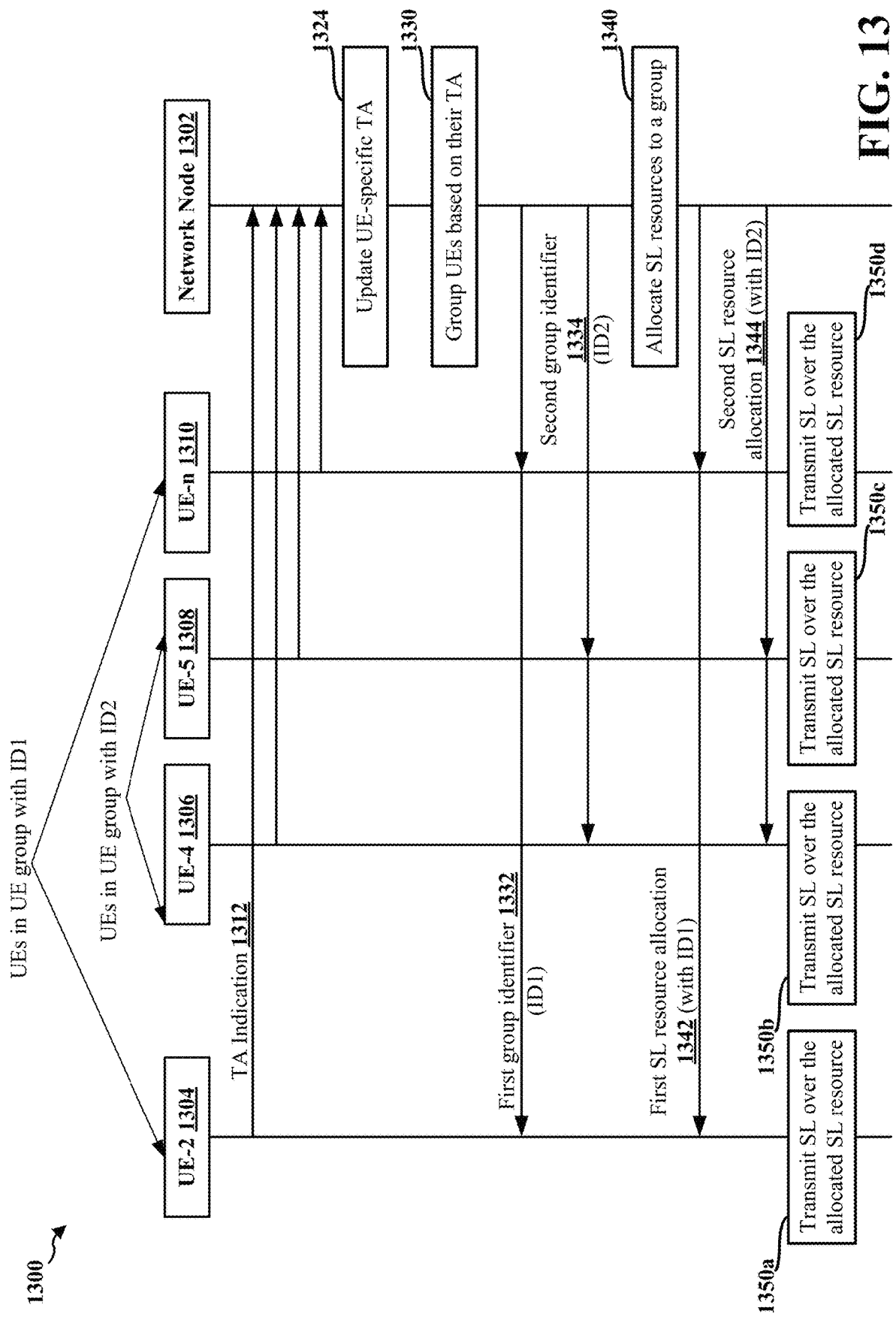
FIG. 13 is an example communication flow between a network node and one or more UEs, in accordance with the teachings disclosed herein.

For example, the UE 1104 may use the sidelink resources allocated at 1152 for a sidelink transmission 1160, e.g., to at least one another UE 1106, based on being a part of the group associated with the group identifier. Other UEs in the group may reuse the same, or overlapping, sidelink resources for their own sidelink transmissions. As the UEs are grouped to include UEs that are distant enough to avoid a threshold level of interference, the UEs may reuse the allocated sidelink resources. The potential for resource reuse enables a more efficient use of sidelink resources, and the resource allocation to a UE group based on a group identifier reduces signaling overhead for the network node to allocate sidelink resources to individual UEs. Although only a single UE is illustrated, the resource allocation may be used for a sidelink transmission by any of the UEs in the corresponding UE group, e.g., as illustrated in FIG. 13.

The UE groups may each have a corresponding group identifier (ID). As an example, a first group in FIG. 9 may have ID1 and may include the UE-2 904 and the UE-n 912. A second group may have ID2 and may include the UE-4 908 and the UE-5 910. The group ID may be an RNTI associated to a sidelink transmission UE, where the RNTI is associated with a proposed group scheduling scheme. The ID may be assigned/updated by the network node, e.g., at 1142. For example, the UE 1104 may determine a group identifier for sidelink resource allocation, at 1140, based on an indication of the group identifier from the network node, at 1142. In some aspects, the group identifier may be assigned/updated for the UE in response to the network node obtaining/deriving the TA (or an update of the TA) for the UE.

In some aspects, a UE may determine a group ID for sidelink resource allocation based on a TA value as applied to a rule or function. For example, the network node 1102 may transmit a group identifier configuration that provides a relationship between a TA value (or range) and a corresponding group ID, such as described in connection with FIG. 12A or 12B. The UE may determine a current TA and identify the corresponding UE group that is associated with the current TA value for the UE.

In some aspects, the UE may transmit a request for the configuration, at 1110, and may receive the configuration, at 1112. In some aspects, the configuration may be pre-configured at the UE and/or fixed in a technical specification.

In some aspects, the coverage area of the network node may include sectors, e.g., smaller zones based on TA values, such as the NTN Uu TA values. A UE (such as UE1, UE2, UE3 or a specific device/node such as a drone) in each zone (e.g., 901a, 901b, 901c) may operate as a cluster head to re-allocate the mode 1 resources obtained from the network node to the other cluster members. In this example, the cluster or UE group may be grouped based on having a TA within a range. In this case, the SL group resource allocation may be multicast/groupcast to the multiple cluster head UEs (e.g., 902, 904, 906) in different zones (e.g., 901a, 901b, 901c), where the group identifier used for the SL group resource allocation is associated to one or multiple TA ranges. As an example, the UE-1 902 may be the cluster head for the group 901a, and may provide sidelink resource allocations to the UE-n 912, the UE-m 914, the UE-4 908, etc. from the resources allocated for the group by the network node 920. The UE-1 902 may allocated non-overlapping sidelink resources to the individual UEs in the group, for example. The association may be based on a rule or function at the network node and the cluster head. In some aspects, the rule/function may be a (pre)configured rule/function. In some aspects, a cluster head UE may derive the group identifier by itself, e.g. according to its own TA value and the configured rule/function.

In some aspects, if a UE experiences bad radio performance (e.g. a sidelink RLF is declared or identified at 1162) when using the allocated sidelink group resource, e.g., allocated at 1152, the UE may report the event to the network node, at 1164. The RLF report may trigger the network node 1102 to update the group(s) (e.g., as performed at 1130) and/or the SL group resource allocation (e.g., provided at 1152). Alternatively, or additionally, the UE may report its (updated) TA to the network, e.g., in response to the RLF, and the UE may receive an updated grouping based on the updated TA.

FIG. 12A illustrates an example table 1200 showing a relationship between TA ranges 1202 and group IDs 1204 for sidelink resource allocation. FIG. 12B illustrates an example table 1250 showing a relationship between TA values 1206 and group IDs 1208. The relationship in FIG. 12A or 12B may be used by the network node 1102 or the UE 1104 in FIG. 11 to determine a UE group for sidelink resource allocation based on a TA of the UE. In some aspects, the configuration 1112 may include information about the relationship between the TAs and the group IDs for sidelink resource allocation.

FIG. 13 illustrates an example communication flow 1300 between a network node 1302 and multiple UEs (1304 1306, 1308, and 1310). The network node may be a node of an NTN, for example, and may correspond to 103, 920, and/or 1102. The network node 1302 may receive a TA indication 1312 from each of the UEs 1304, 1306, 1308, and 1310. In some aspects, the network node may update the UE specific TA for each of the UEs, at 1324. The network node 1302 groups the UEs into UE groups based on their TA. The grouping may form groups of UEs having different TAs that can be assigned the same sidelink resources or that share a similar TA and can have resources allocated by a shared cluster head, e.g., as described in connection with the various aspect of FIG. 9. In some aspects, the network node 1302 may indicate a corresponding group identifier to each of the UEs in the corresponding group, e.g., at 1332 and 1334. The network node 1302 may allocate sidelink transmission resources for the group(s), at 1340. The network node may transmit a first sidelink resource allocation 1342 for group ID1 (which includes the UE 1304 and the UE 1310). The network node may transmit a second sidelink resource allocation 1344 for group ID2 (which includes the UE 1306 and the UE 1308). The UEs 1304 and 1310 may transmit sidelink transmissions 1350a and 1350d using resources from the allocation 1342 for group ID1. The UEs 1306 and 1308 may transmit sidelink transmissions 1350b and 1350c using resources from the allocation 1344 for group ID2.

Figure 14:
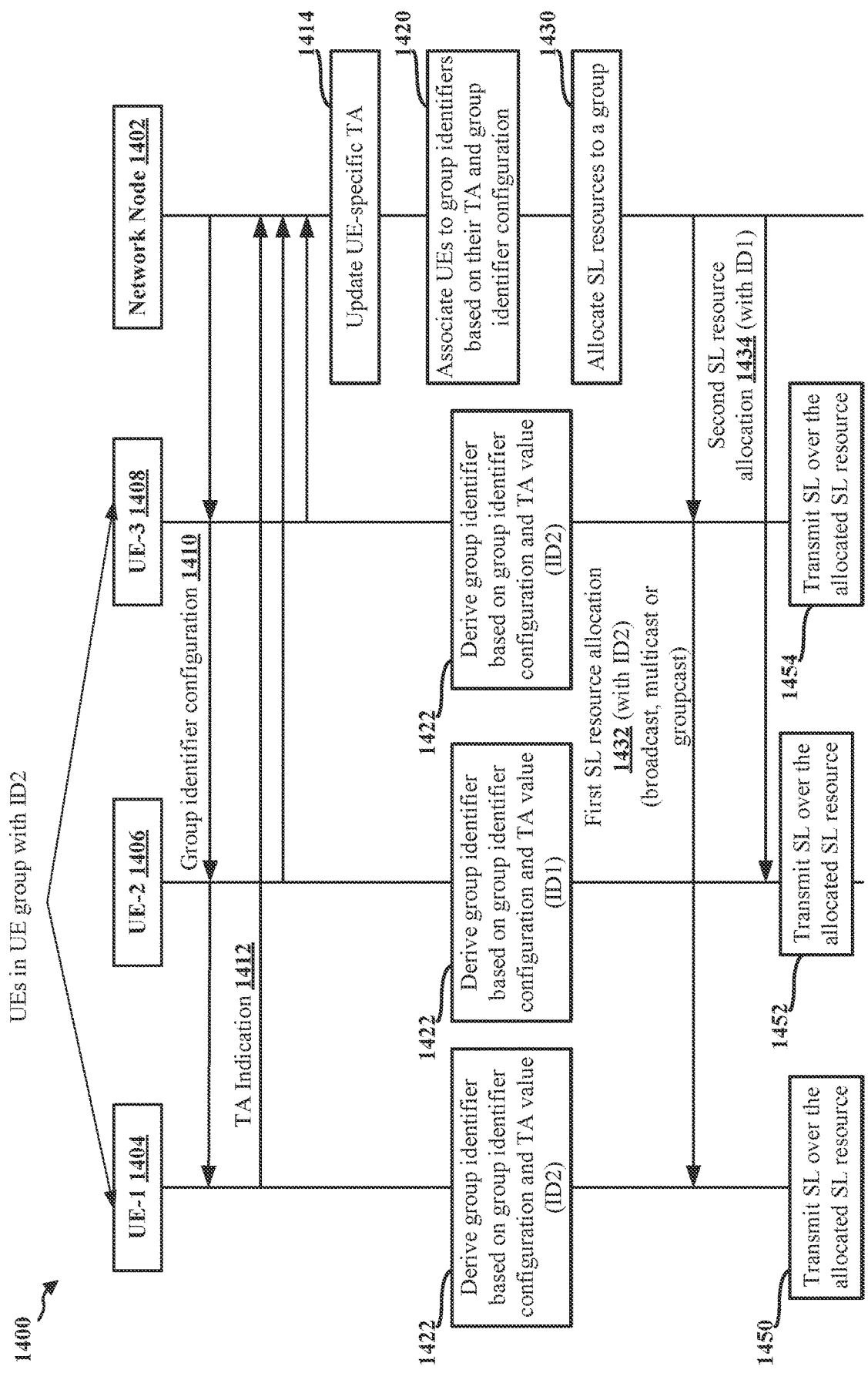
FIG. 14 is an example communication flow between a network node and one or more UEs, in accordance with the teachings disclosed herein.

FIG. 14 illustrates an example communication flow 1400 between a network node 1402 and UEs 1404, 1406, and 1408 in which the UEs may identify a UE group without an explicit indication from the network. The network node 1402 configures the UEs 1404, 1406, and 1408 with a relationship between a TA value/range and a group ID for sidelink resource allocation groups, e.g., as described in connection with FIG. 12A or 12B. The configuration may be referred to as a group identifier configuration 1410. Alternatively, the relationship between a TA value/range and a group ID for sidelink resource allocation groups may be pre-configured at the UEs 1404, 1406, and 1408 and the network node 1402, e.g. according to a technical specification. The UEs may each determine their UE specific TA with the network node 1402, and may derive, at 1422, a group ID based on the configuration 1410 and the TA. The UEs 1404, 1406, and 1408 may transmit their TA information 1412 to the network node 1402. The network node may update the TA stored/applied for the UEs, at 1414, and may associate the UEs with group IDs based on their TA, at 1420. At 1430, the network node 1402 may allocate sidelink resources for the UE groups. The network node may transmit a first sidelink resource allocation for group ID2, at 1432, and may transmit a second sidelink resource allocation for group ID1, at 1434. The resource allocations may be transmitted together or separately. The resource allocations 1432 and/or 1434 may be a broadcast or a groupcast to UEs associated with the group ID. The UE 1404 and the UE 1408 may determine group ID2, at 1422. The UE 1404 may transmit a sidelink transmission, at 1450, using the sidelink resource allocation 1432, and the UE 1408 may transmit a sidelink transmission, at 1454, using the sidelink resource allocation 1432. The UE 1406 may determine group ID1, at 1422, and may transmit a sidelink transmission, at 1452, using the sidelink resource allocation 1434.

Figure 15:
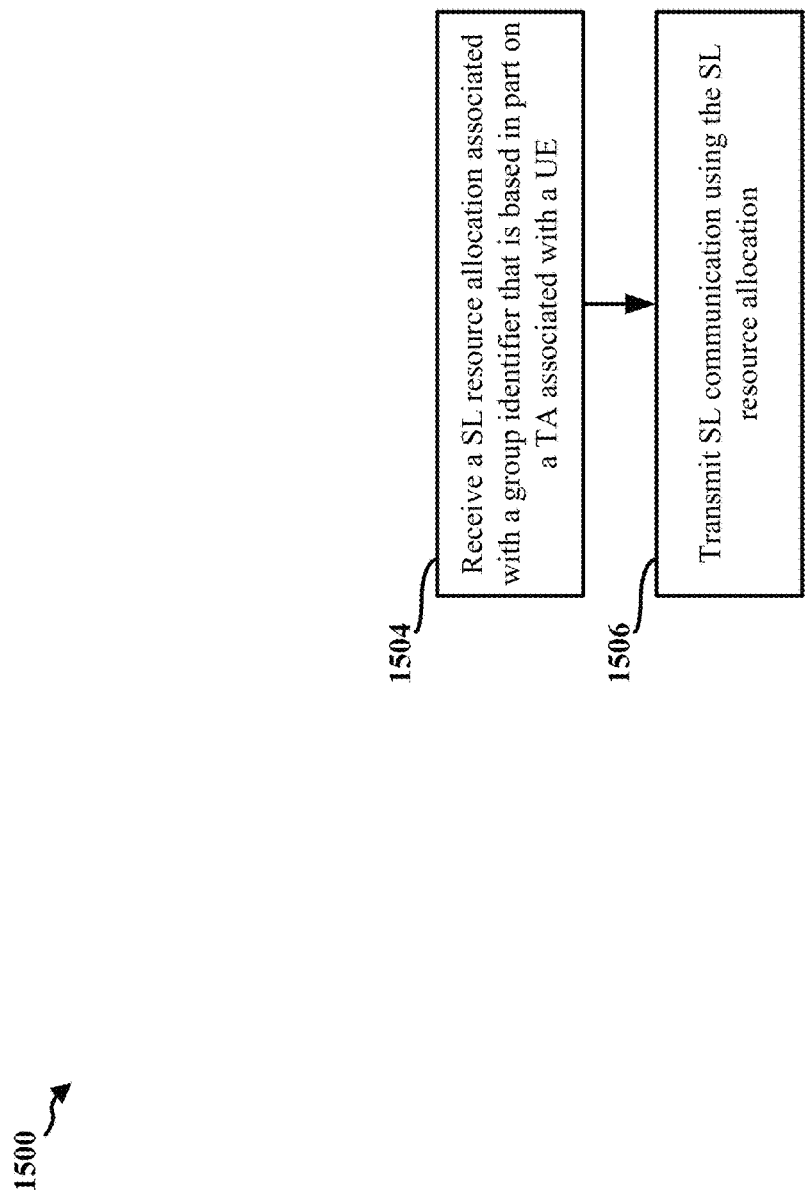
FIG. 15 is a flowchart of a method of wireless communication at a UE, in accordance with the teachings disclosed herein.

FIG. 15 is a flowchart 1500 of a method of wireless communication. The method may be performed by a UE (e.g., the UE 104, 350, 605, 902-914, 1104, 1304, 1306, 1308, 1310 1404, 1406, 1408; the UE 605; the apparatus 1702). The method of FIG. 15 enables mode 1, e.g., centralized, sidelink resource allocation by a network, including an NTN, in a more efficient manner. The method provides for sidelink resources allocation with a reduced number of allocation messages. The method also allows for a more efficient resource allocation and may enable the network, or centralized device, to allocate the same resources to different UEs without high interference between sidelink transmissions.

At 1504, the UE receives a sidelink resource allocation associated with a group identifier that is based at least in part on a TA associated with the UE. As the group identifier is for a group of UEs, the group identifier may be associated with at least the UE and a second UE. The reception of the sidelink resource allocation may be performed, e.g., by the allocation component 1742 of the apparatus 1702 in FIG. 17. For example, the UE may determine a group identifier based at least in part on a TA associated with the UE. In some aspects, the UE may receive the sidelink resource allocation from an NTN. The UE may be a terrestrial UE that is located at, or near, ground level comparing to the NTN device, and the sidelink resource allocation may be received via an NTN. FIG. 11 illustrates an example of a UE 1104 receiving a sidelink resource allocation 1152. FIG. 13 illustrates an example of UE 1304, 1306, 1308, and 1310 receiving SL resource allocations 1342 and 1344, respectively. FIG. 14 illustrates an example of the UEs 1404, 1406, and 1408 receiving sidelink resource allocations 1432 and 1432, respectively.

At 1506, the UE transmits sidelink communication using the sidelink resource allocation. The transmission may be performed, e.g., by the SL communication component 1744 of the apparatus 1702 in FIG. 17. The resource allocation associated with a group identifier enables mode 1 sidelink resource allocation by a network or other centralized device in a more efficient manner. The sidelink resource allocation may apply to multiple UEs, e.g., the UEs associated with the group ID and reduces the number of resource allocation transmissions to allocates resources to the multiple UEs in the same group. Having the group identifier be based at least in part on a TA for each UE, allows for a more efficient resource allocation and may enable the network, or centralized device, to allocate the same resources to different UEs without high interference between sidelink transmissions, e.g., as described in connection with FIG. 9.

Figure 16:
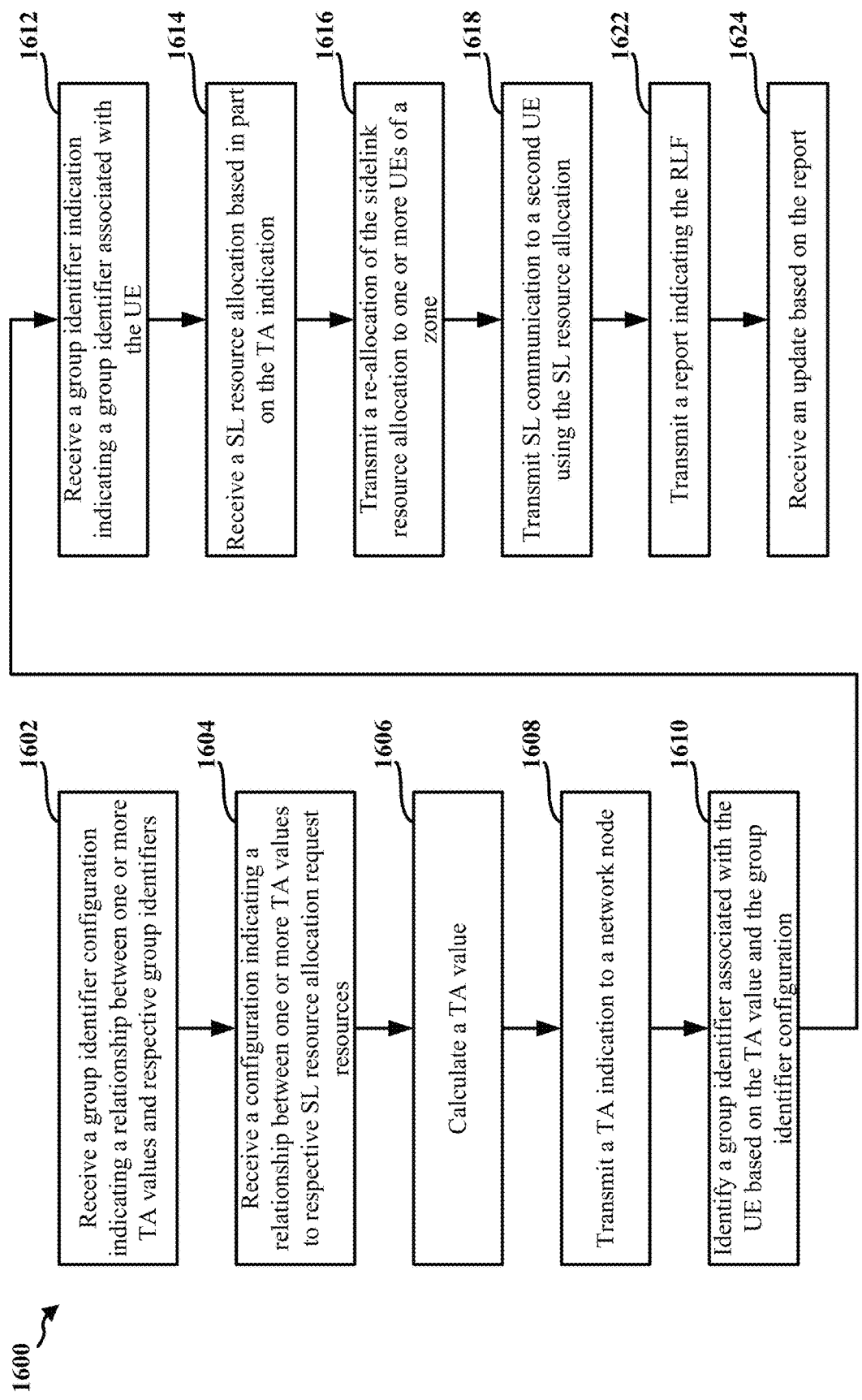
FIG. 16 is a flowchart of a method of wireless communication at a UE, in accordance with the teachings disclosed herein.

FIG. 16 is a flowchart 1600 of a method of wireless communication, e.g., which may include aspects similar to the method in FIG. 15. The method may be performed by a UE (e.g., the UE 104, 350, 605, 902-914, 1104, 1304, 1306, 1308, 1310 1404, 1406, 1408; the UE 605; the apparatus 1702). The method of FIG. 16 enables mode 1, e.g., centralized, sidelink resource allocation by a network, including an NTN, in a more efficient manner. The method provides for sidelink resources allocation with a reduced number of allocation messages. The method also allows for a more efficient resource allocation and may enable the network, or centralized device, to allocate the same resources to different UEs without interference between sidelink transmissions. At 1614, the UE receives a sidelink resource allocation associated with a group identifier that is based at least in part on a TA associated with the UE. As the group identifier is for a group of UEs, the group identifier may be associated with at least the UE and a second UE. The UE may receive the sidelink resource allocation in at least one of multicast, groupcast, or broadcast. The reception of the sidelink resource allocation may be performed, e.g., by the allocation component 1742 of the apparatus 1702 in FIG. 17. For example, the UE may determine a group identifier based at least in part on a TA associated with the UE. In some aspects, the UE may receive the sidelink resource allocation from an NTN. The UE may be a terrestrial UE that is located at, or near, ground level, and the sidelink resource allocation may be received via an NTN. FIG. 11 illustrates an example of a UE 1104 receiving a sidelink resource allocation 1152. FIG. 13 illustrates an example of UE 1304, 1306, 1308, and 1310 receiving SL resource allocations 1342 and 1344, respectively. FIG. 14 illustrates an example of the UEs 1404, 1406, and 1408 receiving sidelink resource allocations 1432 and 1432, respectively.

At 1618, the UE transmits sidelink communication using the sidelink resource allocation. The transmission may be performed, e.g., by the SL communication component 1744 of the apparatus 1702 in FIG. 17. The resource allocation associated with a group identifier enables mode 1 sidelink resource allocation by a network or other centralized device in a more efficient manner. The sidelink resource allocation may apply to multiple UEs, e.g., the UEs associated with the group ID and reduces the number of resource allocation transmissions to allocates resources to the multiple UEs. Having the group identifier be based at least in part on a TA for each UE, allows for a more efficient resource allocation and may enable the network, or centralized device, to allocate the same resources to different UEs without interference between sidelink transmissions, e.g., as described in connection with FIG. 9.

As illustrated at 1608, the UE may transmit a TA indication, the TA indication based on at least part of a round-trip time of a signal between the UE and a reference point. The TA indication may include an updated TA value. FIGS. 11, 13, and 14 illustrates examples of a UE transmitting a TA indication 1122, 1312, and 1412 to a network node. In some aspects, the UE may transmit the TA indication with a sidelink resource allocation request. The UE may receive a configuration of one or more sidelink resources allocation request resources (e.g., for transmitting a request for sidelink resources) and a relationship to one or more TA values. The UE may determine a current TA value for the UE and determine the corresponding resource for transmitting a sidelink resource allocation request based on the relationship to the current TA value for the UE. Then, the UE may transmit a sidelink resource allocation request using a sidelink resource allocation request resource based on a relationship to a TA value. The resource used for the request indicates to the network the TA for the UE. The UE may transmit the TA indication is in at least one of a UCI, a MAC-CE, or an RRC message. The transmission may be performed, e.g., by the group identifier component 1748 of the apparatus 1702 in FIG. 17.

As illustrated at 1612, the UE may receive a group identifier indicator associated with at least the UE. The group identifier may be based on a TA associated with the UE, e.g., as described in connection with any of FIGS. 9-14. The group identifier may include at least a radio network temporary identifier assigned to the UE. The reception may be performed, e.g., by the group identifier component 1748 of the apparatus 1702 in FIG. 17.

As illustrated at 1606, the UE may calculate a TA value, e.g., for communication with the network node, and the UE may determine the group identifier, at 1610 based on calculated TA value. The UE may apply the group identifier configuration, e.g., received at 1602, based on one or more TA value, the group identifier associated with the UE being based on the calculated TA value and the group identifier configuration.

As illustrated at 1616, the UE may transmit a re-allocation of the sidelink resource allocation to one or more UEs, e.g., to one or more UEs of a zone or group.

In some aspects, the UE may detect an occurrence of a sidelink radio link failure while transmitting the sidelink communication via the sidelink resource allocation associated with the group identifier. As illustrated at 1622, the UE may transmit a report based in part on an occurrence of the sidelink radio link failure while transmitting the sidelink communication via the sidelink resource allocation associated with the group identifier. FIG. 11 illustrates an example of a UE 1104 transmitting an RLF report 1164 to the network node 1102. In some aspects, the report may include an updated TA value. The transmission of the report may be performed, e.g., by the RLF component 1750 of the apparatus 1702 in FIG. 17.

At 1624, the UE may receive, based on the report, one or more of: an updated group identifier associated with the UE, an updated sidelink group resource allocation, or an updated group identifier configuration to facilitate determining the updated group identifier based on one or more TA values.

Figure 17:
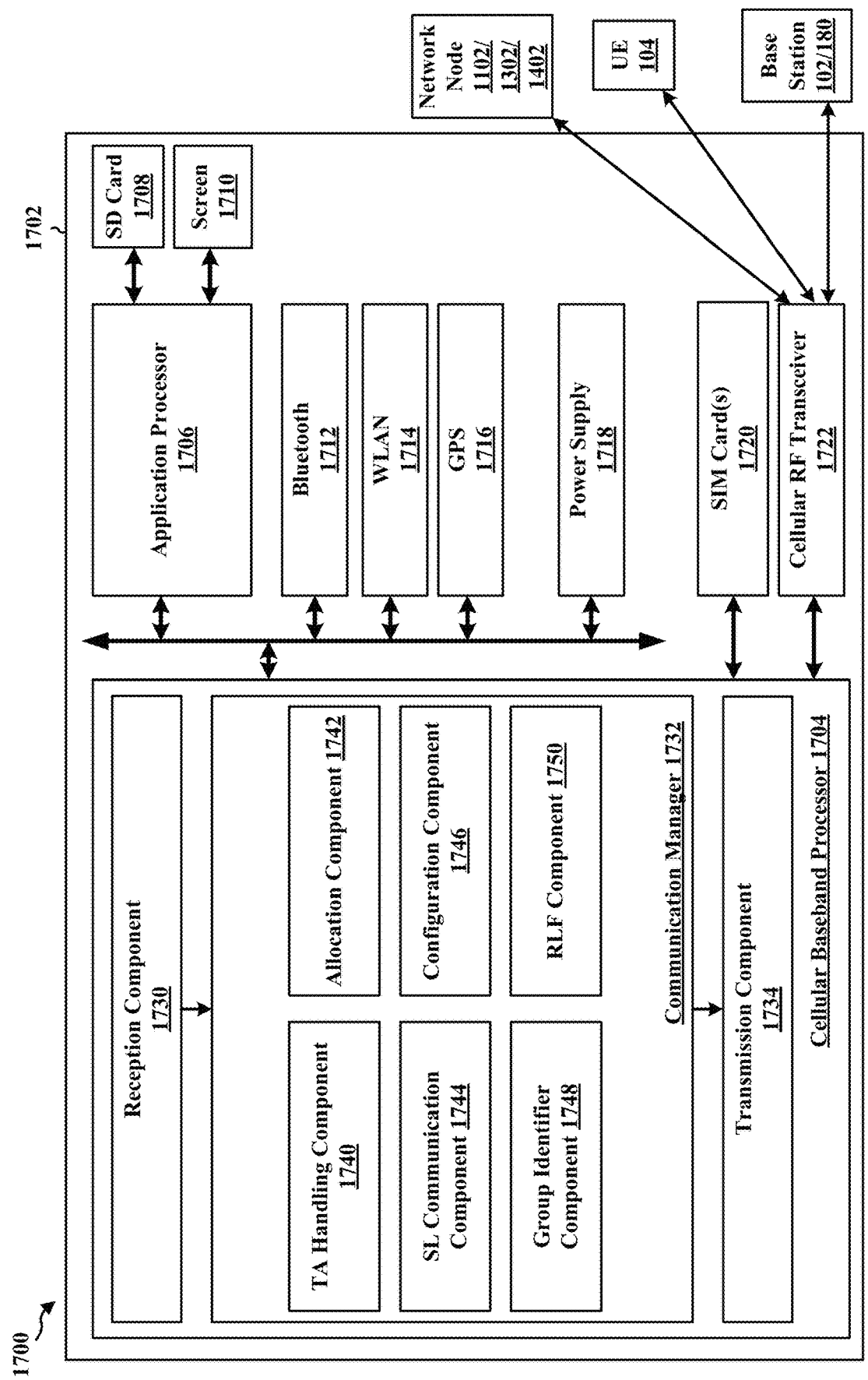
FIG. 17 is a diagram illustrating an example of a hardware implementation for an example apparatus, in accordance with the teachings disclosed herein.

FIG. 17 is a diagram 1700 illustrating an example of a hardware implementation for an apparatus 1702. The apparatus 1702 may be a UE, a component of a UE, may implement UE functionality, or may be another device configured to transmit and/or receive sidelink communication. The apparatus 1702 includes a baseband processor 1704 (also referred to as a modem) coupled to a RF transceiver 1722. In some aspects, the baseband processor 1704 may be a cellular baseband processor and/or the RF transceiver 1722 may be a cellular RF transceiver. The apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and/or a power supply 1718. The baseband processor 1704 communicates through the RF transceiver 1722 with the UE 104 and/or BS 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described in the present application. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes a TA handling component 1740 that is configured to calculate, or otherwise determine, a TA value and/or transmit a TA indication to a network node, e.g., as described in connection with 1604 and/or 1608 in FIG. 16. The communication manager 1732 further includes an allocation component 1742 that is configured to receive a sidelink resource allocation associated with a group identifier that is based at least in part on a TA associated with the UE, e.g., as described in connection with 1504 in FIG. 15 or 1614 in FIG. 16. The communication manager 1732 further includes a SL communication component 1744 that is configured to transmit sidelink communication using the sidelink resource allocation, e.g., as described in connection with 1506 in FIG. 15 or 1618 in FIG. 16. The communication manager 1732 further includes a configuration component 1746 that is configured to receive a configuration indicating a relationship between one or more TA values and respective SL resource allocation request resources and/or receive a group identifier configuration indicating a relationship between one or more TA values and respective group identifiers, e.g., as described in connection with 1602 or 1604 in FIG. 16. The configuration component 1746 may be configured to apply the group identifier configuration based on a calculated TA value, e.g., in the transmission of sidelink communication at 1618. The communication manager 1732 further includes a group identifier component 1748 that is configured to determine a group identifier based at least in part on a TA associated with the UE, to receive a group identifier indicator associated with the UE, or to determine the group identifier associated with the UE based on a calculated TA value and a group identifier configuration, e.g., as described in connection with 1610 in FIG. 16. In some aspects, the group identifier component 1748 and/or the configuration component 1746 may be configured to receive, based on the report, one or more of: an updated group identifier associated with the UE, an updated sidelink group resource allocation, or an updated group identifier configuration to facilitate determining the updated group identifier based on one or more TA values, e.g., as described in connection with 1624 in FIG. 16. The communication manager 1732 further includes an RLF component 1750 that is configured to transmit a report based in part on an occurrence of a sidelink RLF while transmitting the sidelink communication via the sidelink resource allocation associated with the group identifier, e.g., as described in connection with 1622 in FIG. 16. In some aspects, the RLF component 1750 may be further configured to detect the occurrence of the RLF while transmitting the sidelink communication via the sidelink resource allocation associated with the group identifier.

The apparatus may include additional components that perform each of the blocks of the algorithm in the flowcharts of FIGS. 15 and 16, and/or the aspects performed by a UE in FIGS. 11, 13, and/or 14. As such, each block in the flowcharts of FIGS. 15 and 16, and/or the aspects performed by a UE in FIGS. 11, 13, and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband processor 1704, includes means for determining a group identifier based at least in part on a TA associated with the UE, the group identifier associated with at least the UE and a second UE; means for receiving a sidelink resource allocation associated with the group identifier; and means for transmitting sidelink communication using the sidelink resource allocation. The apparatus 1702 may further include means for transmitting a TA indication, the TA indication based on at least part of a round-trip time of a signal between the UE and a reference point. The apparatus 1702 may further include means for transmitting the TA indication with a sidelink resource allocation request. The apparatus 1702 may further include means for transmitting a sidelink resource allocation request using a sidelink resource allocation request resource based on a relationship to a TA value. The apparatus 1702 may further include means for receiving a group identifier indicator associated with at least the UE. The apparatus 1702 may further include means for applying a group identifier configuration based on one or more TA value; and determining the group identifier associated with the UE based on the calculated TA value and the group identifier configuration. The apparatus 1702 may further include means for receiving the group identifier configuration. The apparatus 1702 may further include means for transmitting a report based in part on an occurrence of the sidelink radio link failure while transmitting the sidelink communication via the sidelink resource allocation associated with the group identifier. The apparatus 1702 may further include means for receiving, based on the report, one or more of: an updated group identifier associated with the UE, an updated sidelink group resource allocation, or an updated group identifier configuration to facilitate determining the updated group identifier based on one or more TA values. The means may be one or more of the components of the apparatus 1702 configured to perform the functions recited by the means. As described herein, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
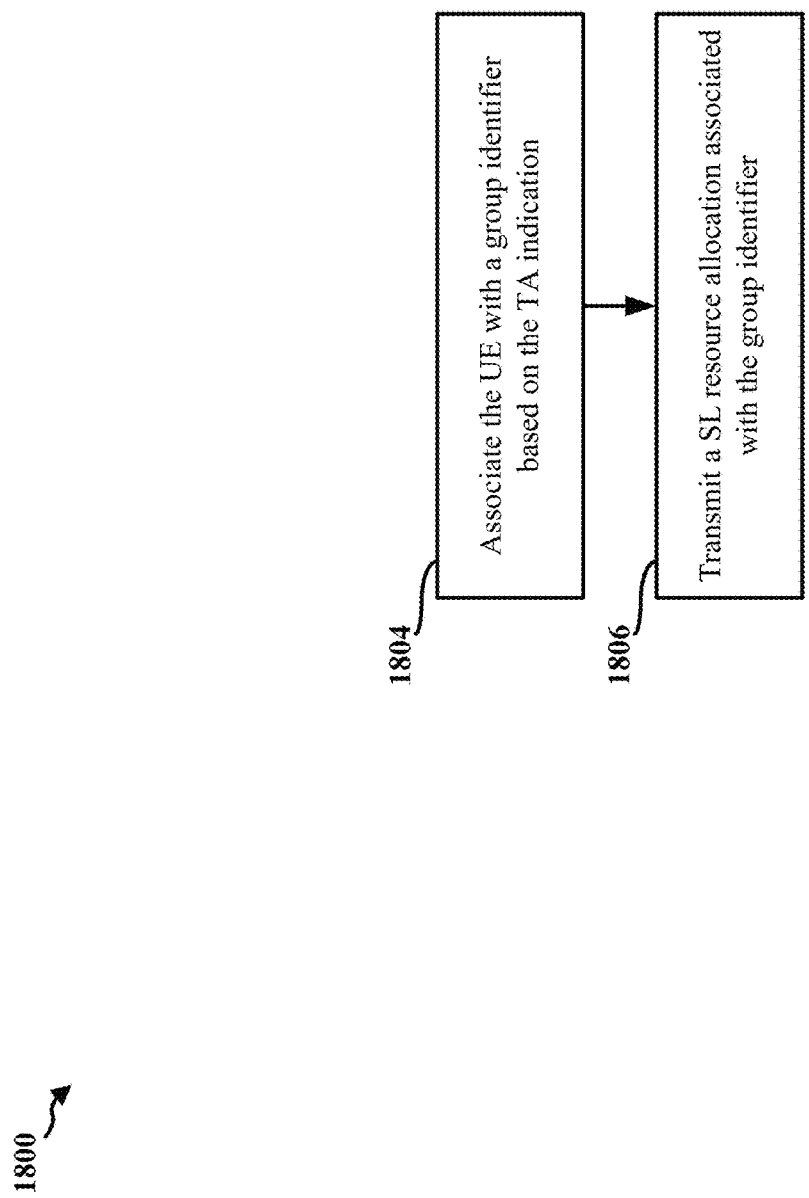
FIG. 18 is a flowchart of a method of wireless communication at a network node, in accordance with the teachings disclosed herein.

FIG. 18 is a flowchart 1800 of a method of wireless communication. The method may be performed by a network node (e.g., the NTN device 103, 510, 602 702, 802; the network node 310, 420, 920, 1102, 1302, 1402; e.g., base station 102 or 180; the apparatus 2002. The method of FIG. 18 enables mode 1, e.g., centralized, sidelink resource allocation by a network, including an NTN, in a more efficient manner. The method provides for sidelink resources allocation with a reduced number of allocation messages. The method also allows for a more efficient resource allocation and may enable the network node to allocate the same resources to different UEs without interference between sidelink transmissions.

At 1804, the network node associates at least one UE with a group identifier based on a TA associated with the UE. The TA may be based, e.g., on at least part of a round-trip time of a signal between the UE and a reference point. The association may be performed, e.g., by the association component 2042 of the apparatus 2002 in FIG. 20. As the group identifier is for a group of UEs, the group identifier may be associated with at least the UE and a second UE. In some aspects, the network node may be a node of an NTN. The UE may be a terrestrial UE that is located at, or near, ground level, and the sidelink resource allocation may be received via an NTN. FIGS. 11, 13, and 14 illustrate examples of a network node associating UE(s) with one or more groups based on a TA, e.g., at 1130, 1330, and 1420, based on a respective TA for each of the UEs.

At 1806, the network node transmits a sidelink resource allocation associated with the group identifier, the group identifier associated with at least the UE and a second UE.

Figure 20:
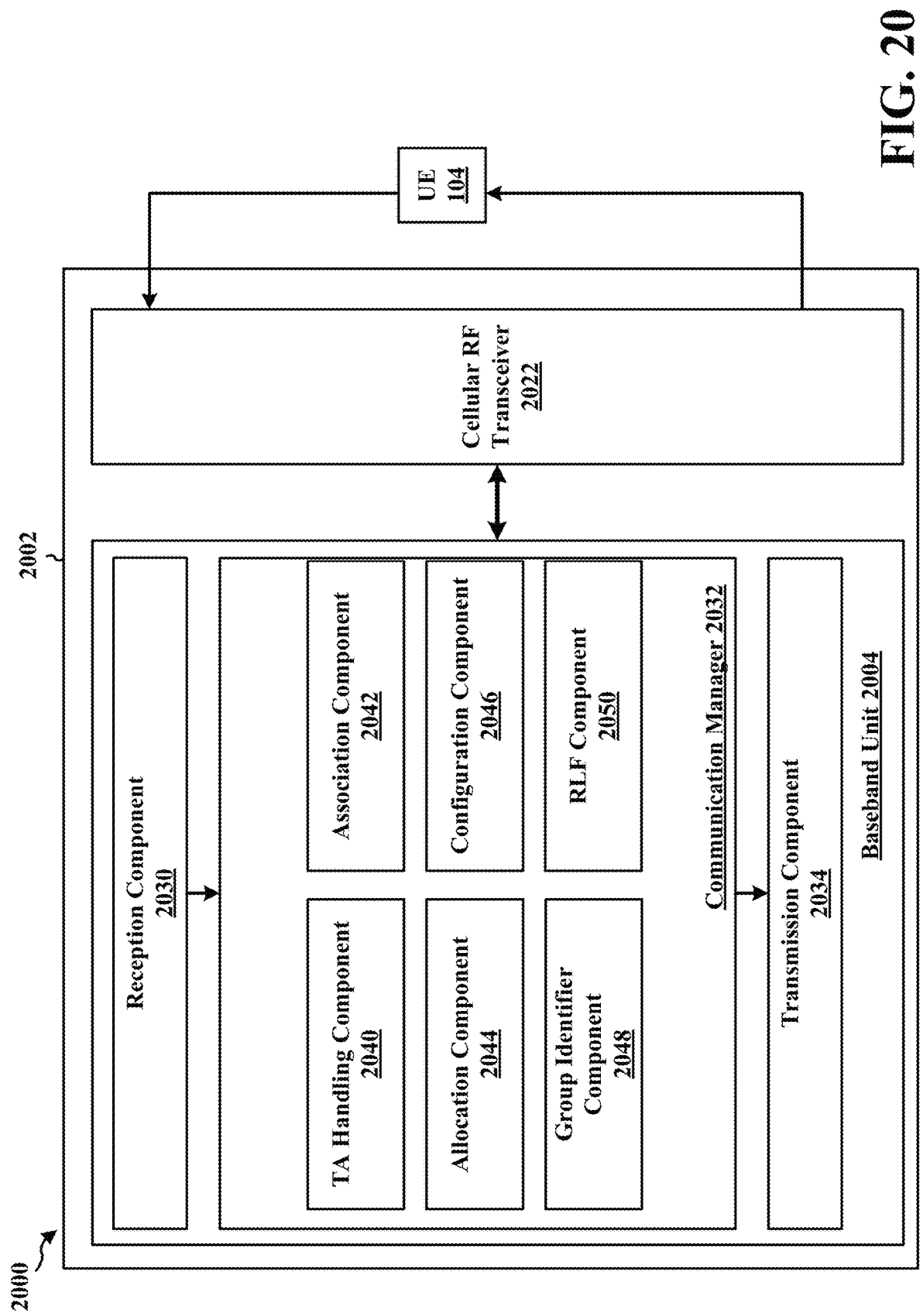
FIG. 20 is a diagram illustrating an example of a hardware implementation for an example apparatus, in accordance with the teachings disclosed herein.

The transmission may be performed, e.g., by the allocation component 2044 of the apparatus 2002 in FIG. 20. The network node may transmit the sidelink resource allocation in at least one of multicast, groupcast, or broadcast. FIG. 11 illustrates an example of a UE 1104 receiving a sidelink resource allocation 1152. FIG. 13 illustrates an example of UE 1304, 1306, 1308, and 1310 receiving SL resource allocations 1342 and 1344, respectively. FIG. 14 illustrates an example of the UEs 1404, 1406, and 1408 receiving sidelink resource allocations 1432 and 1432, respectively.

Figure 19:
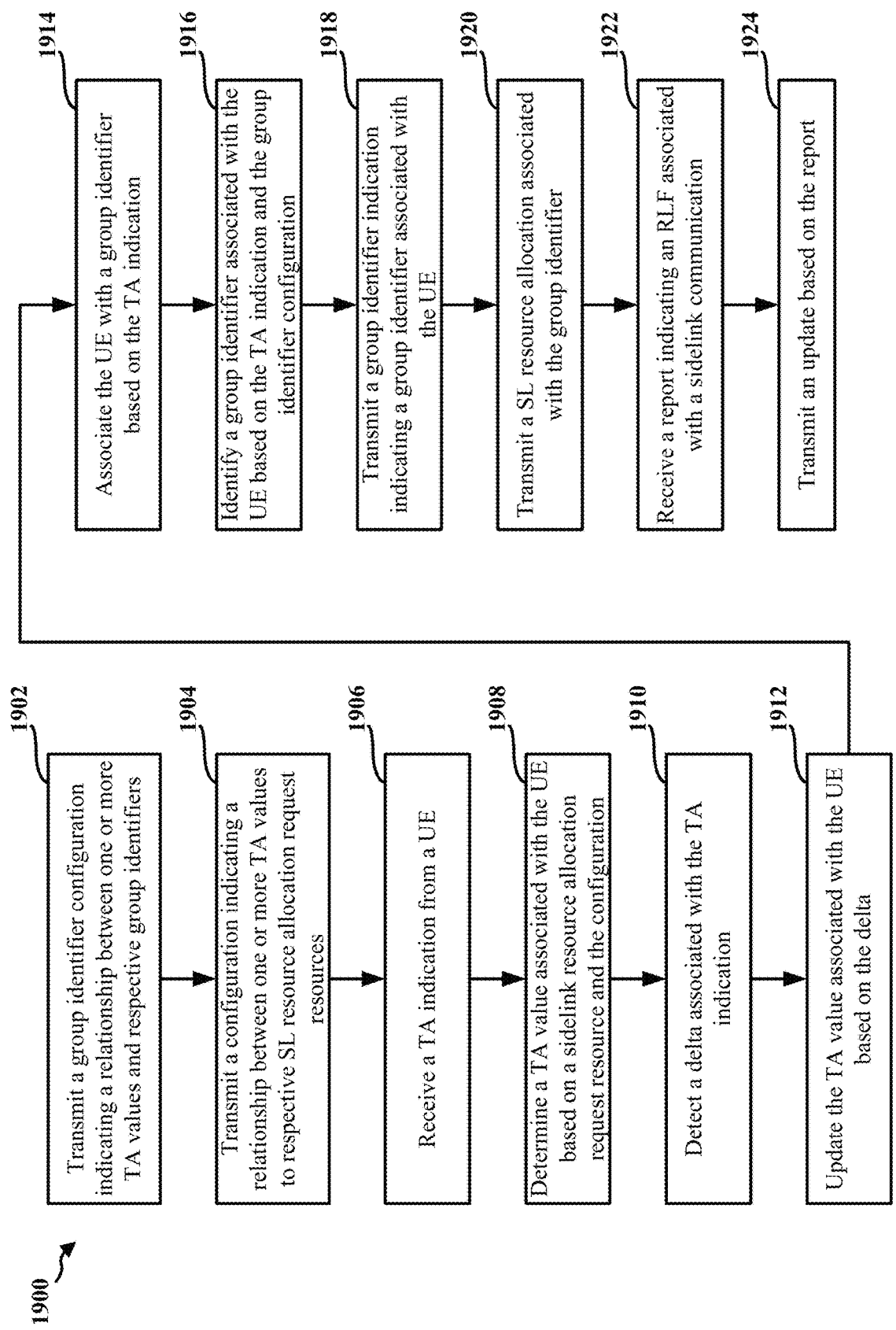
FIG. 19 is a flowchart of a method of wireless communication at a network node, in accordance with the teachings disclosed herein.

FIG. 19 is a flowchart 1900 of a method of wireless communication. The method may be performed by a network node (e.g., the NTN device 103, 510, 602 702, 802; the network node 310, 420, 920, 1102, 1302, 1402; the apparatus 2002. The method of FIG. 19 enables mode 1, e.g., centralized, sidelink resource allocation by a network, including an NTN, in a more efficient manner. The method provides for sidelink resource allocation with a reduced number of allocation messages. The method also allows for a more efficient resource allocation and may enable the network node to allocate the same resources to different UEs without interference between sidelink transmissions.

At 1914, the network node associates at least one UE with a group identifier based on a TA associated with the UE. The TA may be based, e.g., on at least part of a round-trip time of a signal between the UE and a reference point. The association may be performed, e.g., by the association component 2042 of the apparatus 2002 in FIG. 20. As the group identifier is for a group of UEs, the group identifier may be associated with at least the UE and a second UE. In some aspects, the network node may be a node of an NTN. The UE may be a terrestrial UE that is located at, or near, ground level, and the sidelink resource allocation may be received via an NTN. FIGS. 11, 13, and 14 illustrate examples of a network node associating UE(s) with one or more groups based on a TA, e.g., at 1130, 1330, and 1420, based on a respective TA for each of the UEs.

At 1920, the network node transmits a sidelink resource allocation associated with the group identifier, the group identifier associated with at least the UE and a second UE. The transmission may be performed, e.g., by the allocation component 2044 of the apparatus 2002 in FIG. 20. The network node may transmit the sidelink resource allocation in at least one of multicast, groupcast, or broadcast. FIG. 11 illustrates an example of a UE 1104 receiving a sidelink resource allocation 1152. FIG. 13 illustrates an example of UE 1304, 1306, 1308, and 1310 receiving SL resource allocations 1342 and 1344, respectively. FIG. 14 illustrates an example of the UEs 1404, 1406, and 1408 receiving sidelink resource allocations 1432 and 1432, respectively.

As illustrated at 1906, the network node may receive the TA from the UE, and may use the received TA to group the UE into a group of UEs for resource allocation, e.g., associating the UE with a group identifier for the UE group. The TA may include an updated TA value. The network node may receive the TA in a message with a sidelink resource allocation request. The network node may receive the TA in at least one of a control information (UCI), a medium access control—control element (MAC-CE), or a radio resource control (RRC) message. The reception of the TA may be performed, e.g. by a TA handling component 2040 of the apparatus 2002 in FIG. 20. In some aspects, the network node may transmit a configuration indicating one or more sidelink resource allocation request resources and a relationship between one or more TA values to respective sidelink resource allocation request resources, e.g., as illustrated at 1904. The transmission may be performed, e.g., by the configuration component 2046 of the apparatus 2002 in FIG. 20. In some aspects, receiving the TA indication from the UE, at 1906, may include receiving a sidelink resource allocation request from the UE using a sidelink resource allocation request resource, and determining a TA value associated with the UE based on the sidelink resource allocation request resource and the configuration. The network node may transmit the sidelink resource allocation is at least one of a multicast, a groupcast, or a broadcast.

As illustrated at 1918, the network node may transmit a group identifier indication indicating the group identifier associated with at least the UE and the second UE. The group identifier may include at least a radio network temporary identifier assigned to the UE. FIGS. 9-14 illustrates various aspects of UEs associated with a group identifier for sidelink resource allocation.

In some aspects, the network node may determine a group identifier configuration to facilitate determining the group identifier based on one or more TA values. As illustrated at 1916, the network node may identify the group identifier associated with the UE based on the TA and a group identifier configuration, e.g., as illustrated at 1916. As illustrated at 1918, in some aspects, the network node may transmit the group identifier configuration to the UE.

In some aspects, the network node may detect a change in a TA for a UE, e.g., may detect a delta associated with the TA, at 1910, and may update a TA value associated with the UE based on the delta, at 1912. The update may further lead the network node to update a group identifier for the UE, e.g., by grouping the UE into a different group for sidelink resource allocation based on the new TA.

As illustrated at 1922, the network node may receive, from the UE, a report indicating a sidelink radio link failure from using the sidelink resource allocation associated with the group identifier. The report may include an updated TA value. In response, at 1924, the network node may transmit, based on the report, one or more of: an updated group identifier associated with the UE, an updated sidelink group resource allocation, or an updated group identifier configuration. FIG. 11 illustrates an example of a network node 1102 receiving an RLF report 1164.

FIG. 20 is a diagram 2000 illustrating an example of a hardware implementation for an apparatus 2002. The apparatus 2002 may be a network node, a component of a network node, or may implement network node functionality. In some aspects, the apparatus may be associated with an NTN. In some aspects, the apparatus 2002 may include a baseband unit 2004. The baseband unit 2004 may communicate through a cellular RF transceiver 2022 with the UE 104. The baseband unit 2004 may include a computer-readable medium/memory. The baseband unit 2004 is responsible for general processing, including the execution of software stored on the computer-readable medium/ memory. The software, when executed by the baseband unit 2004, causes the baseband unit 2004 to perform the various functions described supra. The computer-readable medium/ memory may also be used for storing data that is manipulated by the baseband unit 2004 when executing software. The baseband unit 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband unit 2004. The baseband unit 2004 may be a component of the network node 310 and may include the memory 376 and/or at least one of the TX processor 316, the RX processor 370, and the controller/processor 375.

The communication manager 2032 includes a TA handling component 2040 that is configured to receive a TA indication from a UE, to determine a TA value associated with a UE, or to detect a delta associated with a TA indication, e.g., as described in connection with 1906, 1908, or 1910 in FIG. 19. The communication manager 2032 further includes an association component 2042 that is configured to associate at least one UE with a group identifier based on a TA associated with the UE, e.g., as described in connection with 1804 and/or 1914 in FIG. 18 or 19. The communication manager 2032 further includes an allocation component 2044 that is configured to transmits a sidelink resource allocation associated with the group identifier, the group identifier associated with at least the UE and a second UE, e.g., as described in connection with 1806 in FIG. 18 or 1920 in FIG. 19. The communication manager 2032 may further include a configuration component 2046 that is configured to may transmit a configuration indicating one or more sidelink resource allocation request resources and a relationship between one or more TA values to respective sidelink resource allocation request resources, e.g., as described in connection with 1904, and/or to transmit a group identifier configuration indicating a relationship between one or more TA values and respective group identifiers, e.g., as at 1902. The communication manager 2032 may further include group identifier component 2048 that is configured to identifier a group identifier associated with the UE based on at least one of a TA and a group identifier configuration, e.g., as described in connection with 1914 and/or 1916. In some aspects, the group identifier component 2048 may be configured to transmit a group identifier indication indicating the group identifier associated with at least the UE and the second UE, e.g., as at 1918. The communication manager 2032 may further include an RLF component 2050 that is configured to receive, from the UE, a report indicating a sidelink radio link failure from using the sidelink resource allocation associated with the group identifier, and/or to provide an update in response to the RLF report, e.g., as described in connection with 1922 and/or 1924 in FIG. 19.

The apparatus may include additional components that perform each of the blocks of the algorithm in the flowcharts of FIGS. 18, 19, and/or any of the aspects performed by the network nodes in FIG. 9, 11, 13, or 14. As such, each block in the flowcharts of FIGS. 18, 19, and/or any of the aspects performed by the network nodes in FIG. 9, 11, 13, or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the baseband unit 2004, includes means for associating a UE with a group identifier based on a TA associated with the UE; and means for transmitting a sidelink resource allocation associated with the group identifier, the group identifier associated with at least the UE and a second UE. The apparatus 2002 may further include means for receiving the TA from the UE, the TA based on at least part of a round-trip time of a signal between the UE and a reference point. The apparatus 2002 may further include means for transmitting a configuration indicating one or more sidelink resource allocation request resources and a relationship between one or more TA values to respective sidelink resource allocation request resources; means for receiving a sidelink resource allocation request from the UE using a sidelink resource allocation request resource; and means for determining a TA value associated with the UE based on the sidelink resource allocation request resource and the configuration. The apparatus 2002 may further include means for transmitting a group identifier indication indicating the group identifier associated with at least the UE and the second UE. The apparatus 2002 may further include means for identifying the group identifier associated with the UE based on the TA and a group identifier configuration. The apparatus 2002 may further include means for transmitting the group identifier configuration to the UE. The apparatus 2002 may further include means for detecting a delta associated with the TA; and means for updating a TA value associated with the UE based on the delta. The apparatus 2002 may further include means for receiving, from the UE, a report indicating a sidelink radio link failure from using the sidelink resource allocation associated with the group identifier. The apparatus 2002 may further include means for transmitting, based on the report, one or more of: an updated group identifier associated with the UE, an updated sidelink group resource allocation, and an updated group identifier configuration to facilitate determining the updated group identifier based on one or more TA values. The means may be one or more of the components of the apparatus 2002 configured to perform the functions recited by the means. As described supra, the apparatus 2002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: determining a group identifier based at least in part on a TA associated with the UE, the group identifier associated with at least the UE and a second UE; receiving a sidelink resource allocation associated with the group identifier; and transmitting sidelink communication using the sidelink resource allocation.

In aspect 2, the method of aspect 1 further includes transmitting a TA indication, the TA indication based on at least part of a round-trip time of a signal between the UE and a reference point.

In aspect 3, the method of aspect 1 or aspect 2 further includes that the TA indication includes an updated TA value.

In aspect 4, the method of aspect 2 or aspect 3 further includes transmitting the TA indication with a sidelink resource allocation request.

In aspect 5, the method of aspect 2 or aspect 3 further includes that the TA indication is in at least one of UCI, a MAC-CE, or an RRC message.

In aspect 6, the method of any of aspects 1-6 further includes transmitting a sidelink resource allocation request using a sidelink resource allocation request resource based on a relationship to a TA value.

In aspect 7, the method of any of aspects 1-6 further includes that the sidelink resource allocation is in at least one of multicast, groupcast, or broadcast.

In aspect 8, the method of any of aspects 1-7 further includes receiving a group identifier indicator associated with at least the UE.

In aspect 9, the method of aspect 8 further includes that the group identifier includes at least a radio network temporary identifier assigned to the UE.

In aspect 10, the method of any of aspects 1-9 further includes that group identifier being based on a TA value associated with the UE.

In aspect 11, the method of aspect 10 further includes applying a group identifier configuration based on one or more TA value; and determining the group identifier associated with the UE based on the calculated TA value and the group identifier configuration.

In aspect 12, the method of aspect 11 further includes receiving the group identifier configuration.

In aspect 13, the method of any of aspects 1-12 further includes transmitting a report based in part on an occurrence of the sidelink radio link failure while transmitting the sidelink communication via the sidelink resource allocation associated with the group identifier.

In aspect 14, the method of aspect 13 further includes that the report includes an updated TA value.

In aspect 15, the method of aspect 13 or aspect 14 further includes receiving, based on the report, one or more of: an updated group identifier associated with the UE, an updated sidelink group resource allocation, or an updated group identifier configuration to facilitate determining the updated group identifier based on one or more TA values.

In aspect 16, the method of any of aspects 1-15 further includes that the network node comprises a non-terrestrial network node.

In aspect 17, the method of any of aspects 1-15 further includes that the network node comprises a terrestrial network node.

Aspect 18 is an apparatus for wireless communication at a UE, comprising means to perform the method of any of aspects 1 to 17.

In aspect 19, the apparatus of aspect 18 further comprising at least one antenna.

In aspect 20, the apparatus of aspect 18 or aspect 19 further comprises a transceiver.

Aspect 21 is an apparatus for wireless communication at a UE, comprising: memory; and at least one processor coupled to the memory, the memory and the at least one processor configured to implement the method of any of aspects 1 to 17.

In aspect 22, the apparatus of aspect 21, further comprising at least one antenna.

In aspect 23, the apparatus of aspect 20 or aspect 21, further comprises a transceiver.

Aspect 24 is a non-transitory computer-readable medium storing computer executable code for wireless communication at a UE, the code when executed by a processor causes the processor to implement the method of any of aspects 1 to 17.

Aspect 25 is a method of wireless communication at a network node, comprising: associating a UE with a group identifier based on a TA associated with the UE; and transmitting a sidelink resource allocation associated with the group identifier, the group identifier associated with at least the UE and a second UE.

In aspect 26, the method of aspect 25 further includes receiving the TA from the UE, the TA based on at least part of a round-trip time of a signal between the UE and a reference point.

In aspect 27, the method of aspect 25 or 26 further includes the TA includes an updated TA value.

In aspect 28, the method of any of aspects 25-27 further includes that the TA is in a message with a sidelink resource allocation request.

In aspect 29, the method of any of aspects 25-27 further includes that the TA is in at least one of a UCI, a MAC-CE, or an RRC message.

In aspect 30, the method of any of aspects 25-28 further includes transmitting a configuration indicating one or more sidelink resource allocation request resources and a relationship between one or more TA values to respective sidelink resource allocation request resources; receiving a sidelink resource allocation request from the UE using a sidelink resource allocation request resource; and determining a TA value associated with the UE based on the sidelink resource allocation request resource and the configuration.

In aspect 31, the method of any of aspects 25-30 further includes that the sidelink resource allocation is at least one of a multicast, a groupcast, or a broadcast.

In aspect 32, the method of any of aspects 23-29 further includes transmitting a group identifier indication indicating the group identifier associated with at least the UE and the second UE.

In aspect 33, the method of aspect 32 further includes that the group identifier includes at least a radio network temporary identifier assigned to the UE.

In aspect 34, the method of any of aspects 25-31 further includes identifying the group identifier associated with the UE based on the TA and a group identifier configuration.

In aspect 35, the method of aspect 33 further includes transmitting the group identifier configuration to the UE.

In aspect 36, the method of any of aspects 25-35 further includes detecting a delta associated with the TA; and updating a TA value associated with the UE based on the delta.

In aspect 37, the method of any of aspects 25-34 further includes receiving, from the UE, a report indicating a sidelink radio link failure from using the sidelink resource allocation associated with the group identifier.

In aspect 38, the method of aspect 37 further includes that the report includes an updated TA value.

In aspect 39, the method of aspect 37 or 36 further includes transmitting, based on the report, one or more of: an updated group identifier associated with the UE, an updated sidelink group resource allocation, and an updated group identifier configuration to facilitate determining the updated group identifier based on one or more TA values.

In aspect 40, the method of any of aspects 25-39 further includes that the network node comprises a non-terrestrial network node.

In aspect 41, the method of any of aspects 25-39 further includes that the network node comprises a terrestrial network node.

Aspect 42 is an apparatus for wireless communication at a network node, comprising means to perform the method of any of aspects 25-41.

In aspect 43, the apparatus of aspect 42 further comprising at least one antenna.

In aspect 44, the apparatus of aspect 42 or aspect 43 further comprises a transceiver.

Aspect 45 is an apparatus for wireless communication at a network node, comprising: memory; and at least one processor coupled to the memory, the memory and the at least one processor configured to implement the method of any of aspects 25-41.

In aspect 46, the apparatus of aspect 45, further comprising at least one antenna.

In aspect 47, the apparatus of aspect 45 or aspect 46, further comprises a transceiver.

Aspect 48 is a non-transitory computer-readable medium storing computer executable code for wireless communication at a network node, the code when executed by a processor causes the processor to implement the method of any of aspects 25-41.

What is claimed is:

1. An apparatus for wireless communication at a user equipment (UE), comprising:
   memory; and
   one or more processors coupled to the memory, wherein the one or more processors are configured to cause the UE to:
      determine a group identifier associated with the UE, wherein the group identifier is associated with at least the UE and a second UE based at least in part on a difference between a first timing advance (TA) value associated with the UE and a second TA value associated with the second UE, wherein the difference between the first TA value and the second TA value is associated with a level of mutual interference between a first sidelink (SL) transmission associated with the UE and a second SL transmission associated with the second UE that is below a threshold level of mutual interference;
      receive a sidelink resource allocation associated with the group identifier; and
      transmit sidelink communication that uses the sidelink resource allocation.

2. The apparatus of claim 1, further comprising:
   one or more antennas coupled to the one or more processors, the one or more processors further configured to cause the UE to:
      transmit a TA indication, the TA indication based on at least part of a round-trip time of a signal between the UE and a reference point.

3. The apparatus of claim 2, wherein the TA indication includes an updated TA value.

4. The apparatus of claim 2, wherein the one or more processors are further configured to cause the UE to:
   transmit the TA indication with a sidelink resource allocation request.

5. The apparatus of claim 2, wherein the TA indication is in at least one of a control information (UCI), a medium access control-control element (MAC-CE), or a radio resource control (RRC) message.

6. The apparatus of claim 1, wherein the one or more processors are further configured to cause the UE to:
   transmit a sidelink resource allocation request that uses a sidelink resource allocation request resource based on a relationship to a TA value.

7. The apparatus of claim 1, wherein the sidelink resource allocation is in at least one of multicast, groupcast, or broadcast.

8. The apparatus of claim 1, wherein the one or more processors are further configured to cause the UE to:
   receive a group identifier indicator associated with at least the UE, wherein the one or more processors are configured to cause the UE to determine the group identifier based on the group identifier indicator.

9. The apparatus of claim 8, wherein the group identifier includes at least a radio network temporary identifier assigned to the UE.

10. The apparatus of claim 1, wherein the group identifier is based on the first TA value associated with the UE.

11. The apparatus of claim 10, wherein the one or more processors are further configured to cause the UE to:
    determine the group identifier associated with the UE based on a current TA value and a group identifier configuration.

12. The apparatus of claim 11, wherein the one or more processors are further configured to cause the UE to:
receive the group identifier configuration.

13. The apparatus of claim 1, wherein the one or more processors are further configured to cause the UE to:
transmit a report based at least in part on an occurrence of a sidelink radio link failure during transmission of the sidelink communication via the sidelink resource allocation associated with the group identifier.

14. The apparatus of claim 13, wherein the report includes an updated TA value.

15. The apparatus of claim 13, wherein the one or more processors are further configured to cause the UE to:
receive, based on the report, one or more of:
an updated group identifier associated with the UE,
an updated sidelink group resource allocation, or
an updated group identifier configuration.

16. The apparatus of claim 1, wherein the one or more processors are configured, individually or in combination, to cause the UE to determine the group identifier, receive the sidelink resource allocation associated with the group identifier, and transmit the sidelink communication that uses the sidelink resource allocation.

17. A method of wireless communication at a user equipment (UE), comprising:
determining a group identifier associated with the UE, wherein the group identifier is associated with at least the UE and a second UE based at least in part on a difference between a first timing advance (TA) value associated with the UE and a second TA value associated with the second UE, wherein the difference between the first TA value and the second TA value is associated with a level of mutual interference between a first sidelink transmission associated with the UE and a second SL transmission associated with the second UE that is below a threshold level of mutual interference;
receiving a sidelink resource allocation associated with the group identifier; and
transmitting sidelink communication using the sidelink resource allocation.

18. The method of claim 16, further comprising:
receiving a group identifier indicator associated with at least the UE.

19. The method of claim 17, further comprising:
transmitting a TA indication, the TA indication based on at least part of a round-trip time of a signal between the UE and a reference point.

20. The method of claim 17, further comprising:
transmitting a sidelink resource allocation request using a sidelink resource allocation request resource based on a relationship to a TA value.

21. The method of claim 17, further comprising:
determining the group identifier associated with the UE based on a current TA value and a group identifier configuration.

22. The method of claim 17, further comprising:
transmitting a report based at least in part on an occurrence of a sidelink radio link failure while transmitting the sidelink communication via the sidelink resource allocation associated with the group identifier.

23. An apparatus for wireless communication at a network node, comprising:
memory; and
one or more processors coupled to the memory and the one or more processors configured to cause the network node to:
associate a first user equipment (UE) and a second UE with a group identifier based on a difference between a first timing advance (TA) value associated with the first UE and a second TA value associated with the second UE, wherein the difference between the first TA value and the second TA value is associated with a level of mutual interference between a first sidelink transmission associated with the first UE and a second SL transmission associated with the second UE that is below a threshold level of mutual interference; and
transmit, for at least the first UE and the second UE, a sidelink resource allocation associated with the group identifier.

24. The apparatus of claim 18, further comprising:
one or more antennas coupled to the one or more processors, the one or more processors further configured to cause the network node to:
receive the first TA value from the first UE and the second TA value from the second UE, the first TA value based on at least part of a first round-trip time of a first signal between the first UE and a first reference point and the second TA value based on at least part of a second round-trip time of a second signal between the second UE and a second reference point.

25. The apparatus of claim 24, wherein the first TA value is in a message with a sidelink resource allocation request.

26. The apparatus of claim 23, wherein the one or more processors are further configured to cause the network node to:
transmit a configuration that indicates one or more sidelink resource allocation request resources and a relationship between one or more TA values to respective sidelink resource allocation request resources;
receive a sidelink resource allocation request from the first UE that uses a sidelink resource allocation request resource; and
determine a TA value associated with the first UE based on the sidelink resource allocation request resource and the configuration.

27. The apparatus of claim 23, wherein the sidelink resource allocation is in at least one of a multicast, a groupcast, or a broadcast.

28. The apparatus of claim 23, wherein the one or more processors are further configured to cause the network node to:
transmit a group identifier indication that indicates the group identifier associated with at least the first UE and the second UE.

29. The apparatus of claim 28, wherein the group identifier includes at least a radio network temporary identifier assigned to the first UE.

30. The apparatus of claim 23, wherein the one or more processors are further configured to cause the network node to:
identify the group identifier associated with the first UE based on the first TA value and a group identifier configuration.

31. The apparatus of claim 30, wherein the one or more processors are further configured to cause the network node to:
transmit the group identifier configuration to the first UE.

32. The apparatus of claim 23, wherein the one or more processors are further configured to cause the network node to:

receive, from the first UE, a report that indicates a sidelink radio link failure from use of the sidelink resource allocation associated with the group identifier.

33. The apparatus of claim 32, wherein the report includes an updated first TA value.

34. The apparatus of claim 32, wherein the one or more processors are further configured to cause the network node to:
transmit, based on the report, one or more of:
an updated group identifier associated with the first UE,
an updated sidelink group resource allocation, or
an updated group identifier configuration.

35. The apparatus of claim 23, wherein the one or more processors are configured, individually or in combination, to cause the network node to associate the first UE and the second UE with the group identifier, and transmit the sidelink resource allocation associated with the group identifier.

36. A method of wireless communication at a network node, comprising:
associating a first user equipment (UE) and a second UE with a group identifier based on a difference between a first timing advance (TA) value associated with the first UE and a second TA value associated with the second UE, wherein the difference between the first TA value and the second TA value is associated with a level of mutual interference between a first sidelink transmission associated with the first UE and a second SL transmission associated with the second UE that is below a threshold level of mutual interference; and
transmitting, for at least the first UE and the second UE, a sidelink resource allocation associated with the group identifier.

37. The method of claim 36, further comprising:
receiving the first TA value from the first UE and the second TA value from the second UE, the first TA value based on at least part of a first round-trip time of a first signal between the first UE and a first reference point and the second TA value based on at least part of a second round-trip time of a second signal between the second UE and a second reference point.

38. The method of claim 36, further comprising:
transmitting a configuration indicating one or more sidelink resource allocation request resources and a relationship between one or more TA values to respective sidelink resource allocation request resources;
receiving a sidelink resource allocation request from the first UE using a sidelink resource allocation request resource; and
determining a TA value associated with the first UE based on the sidelink resource allocation request resource and the configuration.

39. The method of claim 36, further comprising:
transmitting a group identifier indication indicating the group identifier associated with at least the first UE and the second UE.

40. The method of claim 36, further comprising:
identifying the group identifier associated with the first UE based on the first TA value and a group identifier configuration.

41. The method of claim 36, further comprising:
receiving, from the first UE, a report indicating a sidelink radio link failure from using the sidelink resource allocation associated with the group identifier.

42. A non-transitory computer-readable storage medium comprising computer-executable code at a user equipment (UE), the computer-executable code, when executed, causes one or more processors of the UE to:
determine a group identifier associated with the UE, wherein the group identifier is associated with at least the UE and a second UE based at least in part on a difference between a first timing advance (TA) value associated with the UE and a second TA value associated with the second UE, wherein the difference between the first TA value and the second TA value is associated with a level of mutual interference between a first sidelink transmission associated with the UE and a second SL transmission associated with the second UE that is below a threshold level of mutual interference;
receive a sidelink resource allocation associated with the group identifier; and
transmit sidelink communication that uses the sidelink resource allocation.

43. The non-transitory computer-readable storage medium of claim 42, wherein the computer-executable code, when executed, causes the one or more processors of the UE to:
receive a group identifier indicator associated with at least the UE, wherein the computer-executable code, when executed, causes the one or more processors of the UE to determine the group identifier based on the group identifier indicator.

44. The non-transitory computer-readable storage medium of claim 42, wherein the computer-executable code, when executed, causes the one or more processors of the UE to:
transmit a TA indication, the TA indication based on at least part of a round-trip time of a signal between the UE and a reference point.

45. The non-transitory computer-readable storage medium of claim 42, wherein the computer-executable code, when executed, causes the one or more processors of the UE to:
transmit a sidelink resource allocation request using a sidelink resource allocation request resource based on a relationship to a TA value.

46. The non-transitory computer-readable storage medium of claim 42, wherein the computer-executable code, when executed, causes the one or more processors of the UE to:
determine the group identifier associated with the UE based on a current TA value and a group identifier configuration.

47. The non-transitory computer-readable storage medium of claim 42, wherein the computer-executable code, when executed, causes the one or more processors of the UE to:
transmit a report based at least in part on an occurrence of a sidelink radio link failure while transmitting the sidelink communication via the sidelink resource allocation associated with the group identifier.

48. A non-transitory computer-readable storage medium comprising computer-executable code at a network node, the computer-executable code, when executed, causes one or more processors of the network node to:
associate a first user equipment (UE) and a second UE with a group identifier based on a difference between a first timing advance (TA) value associated with the first UE and a second TA value associated with the second UE, wherein the difference between the first TA value and the second TA value is associated with a level of mutual interference between a first sidelink transmission associated with the first UE and a second SL transmission associated with the second UE that is below a threshold level of mutual interference; and transmit, for at least the first UE and the second UE, a sidelink resource allocation associated with the group identifier.

49. The non-transitory computer-readable storage medium of claim 48, wherein the computer-executable code, when executed, causes the one or more processors of the network node to:

receive the first TA value from the first UE and the second TA value from the second UE, the first TA value based on at least part of a first round-trip time of a first signal between the first UE and a first reference point and the second TA value based on at least part of a second round-trip time of a second signal between the second UE and a second reference point.

50. The non-transitory computer-readable storage medium of claim 48, wherein the computer-executable code, when executed, causes the one or more processors of the network node to:

transmit a configuration that indicates one or more sidelink resource allocation request resources and a relationship between one or more TA values to respective sidelink resource allocation request resources;

receive a sidelink resource allocation request from the first UE that uses a sidelink resource allocation request resource; and determine a TA value associated with the first UE based on the sidelink resource allocation request resource and the configuration.

51. The non-transitory computer-readable storage medium of claim 48, wherein the computer-executable code, when executed, causes the one or more processors of the network node to:

transmit a group identifier indication that indicates the group identifier associated with at least the first UE and the second UE.

52. The non-transitory computer-readable storage medium of claim 48, wherein the computer-executable code, when executed, causes the one or more processors of the network node to:

identify the group identifier associated with the first UE based on the first TA value and a group identifier configuration.

53. The non-transitory computer-readable storage medium of claim 48, wherein the computer-executable code, when executed, causes the one or more processors of the network node to:

receive, from the first UE, a report that indicates a sidelink radio link failure from use of the sidelink resource allocation associated with the group identifier.

* * * * *